(12) United States Patent
Knecht et al.

(10) Patent No.: US 12,471,760 B2
(45) Date of Patent: Nov. 18, 2025

(54) SYSTEMS, METHODS, AND APPARATUS FOR ATTACHING AN OTOSCOPE

(71) Applicant: Kenvue Brands LLC, Summit, NJ (US)

(72) Inventors: Max Hunter Knecht, Brooklyn, NY (US); Stephen Anton, Union, NJ (US); Sean James Coyle, Pennington, NJ (US); Nathan Wald, Summit, NJ (US); Eleanor F. Small, Philadelphia, PA (US); Nicole Kaminsky, Yardley, PA (US)

(73) Assignee: Kenvue Brands LLC, Summit, NJ (US)

( * ) Notice: Subject to any disclaimer, the term of this patent is extended or adjusted under 35 U.S.C. 154(b) by 1097 days.

(21) Appl. No.: 17/364,981

(22) Filed: Jul. 1, 2021

(65) Prior Publication Data
US 2022/0000342 A1    Jan. 6, 2022

Related U.S. Application Data

(60) Provisional application No. 63/047,400, filed on Jul. 2, 2020.

(51) Int. Cl.
| | | |
|---|---|---|
| *A61B 1/00* | (2006.01) | |
| *A61B 1/06* | (2006.01) | |
| *A61B 1/227* | (2006.01) | |

(52) U.S. Cl.
CPC ........ *A61B 1/0014* (2013.01); *A61B 1/00045* (2013.01); *A61B 1/00105* (2013.01);
(Continued)

(58) Field of Classification Search
CPC .............. A61B 1/0014; A61B 1/00045; A61B 1/00105; A61B 1/00112; A61B 1/00147;
(Continued)

(56) References Cited

U.S. PATENT DOCUMENTS

| | | |
|---|---|---|
| D243,477 S | 2/1977 | Schattner et al. |
| D274,260 S | 6/1984 | Wiedel |
| | (Continued) | |

FOREIGN PATENT DOCUMENTS

| | | |
|---|---|---|
| CA | 213535 S | 4/2024 |
| CN | 104781714 A | 7/2015 |
| | (Continued) | |

OTHER PUBLICATIONS

"Tylenol SmartCheck 2.0 Digital Ear Scope from Children's, Otoscope with Light for iPhone & Android, Ear Camera; Includes 1 Otoscope Clamp, 12 Specula Tips; 6 Pediatric Tips, 6 Child/Adult Tips", Amazon.com, Available online at: "https://www.amazon.com/SmartCheck-Childrens-Tylenol-Otoscope-Recordings/dp/B09M8WHQV2", Nov. 19, 2021.
(Continued)

*Primary Examiner* — Alfred J Wujciak
(74) *Attorney, Agent, or Firm* — Condo Roccia Koptiw LLP

(57) ABSTRACT

A device for attaching an optical element, such as an otoscope, to a smart phone for diagnosing and/or identifying problems of an outer ear, a middle ear, and/or an ear canal of a patient. The device may comprise a main body. The main body may comprise an aperture and a first engagement member configured to engage with a second engagement structure that belongs to the optical element. A first surface may be connected to the main body and configured may be to contact a first smart phone surface. A piston may be provided that may comprises a second surface that may be parallel to the first surface and may be configured to contact a second smart phone surface. A threaded knob may be provided and may be connected to the piston through the aperture.

20 Claims, 18 Drawing Sheets

(52) U.S. Cl.
CPC ...... *A61B 1/00112* (2013.01); *A61B 1/00147* (2013.01); *A61B 1/0684* (2013.01); *A61B 1/227* (2013.01)

(58) Field of Classification Search
CPC ...... A61B 1/0684; A61B 1/227; F16M 13/00; F16M 13/02; F16M 13/022; F16B 2/02; F16B 2/04; F16B 2/06; F16B 2/18; F16B 2/20; F16B 2/243; F16B 2/245; G03B 30/00
USPC ..... 248/231.81, 231.71, 316.7, 316.1, 316.2, 248/226.11, 229.16, 229.15, 686, 689
See application file for complete search history.

(56) References Cited

U.S. PATENT DOCUMENTS

| | | |
|---|---|---|
| D325,630 S | 4/1992 | Feinbloom et al. |
| D346,655 S | 5/1994 | Harris |
| D373,823 S | 9/1996 | Baldwin |
| D374,077 S | 9/1996 | Butler |
| D391,636 S | 3/1998 | Zwerk |
| D421,123 S | 2/2000 | Kugler et al. |
| D423,668 S | 4/2000 | Coe |
| D439,335 S | 3/2001 | Walls et al. |
| 7,324,156 B2 * | 1/2008 | Lohr ........................ G02B 7/00 348/360 |
| D571,463 S | 6/2008 | Chesnin |
| D592,304 S | 5/2009 | Kuehfuss |
| D607,562 S | 1/2010 | Heine et al. |
| D619,705 S | 7/2010 | Foy et al. |
| D629,898 S | 12/2010 | Bigelow |
| D655,407 S | 3/2012 | Adams |
| D657,054 S | 4/2012 | Bacon |
| D659,246 S | 5/2012 | Mcgrath et al. |
| D679,809 S | 4/2013 | Clarke et al. |
| 8,760,569 B2 * | 6/2014 | Yang ...................... H04N 23/51 348/373 |
| D710,994 S | 8/2014 | Yazbeck |
| D716,443 S | 10/2014 | Marguerie |
| D723,679 S | 3/2015 | Neff et al. |
| D734,452 S | 7/2015 | Sharpe |
| 9,195,023 B2 | 11/2015 | O'Neill et al. |
| D751,702 S | 3/2016 | Eaton et al. |
| D788,911 S | 6/2017 | Deutsch et al. |
| D802,757 S | 11/2017 | Snyder et al. |
| D817,486 S | 5/2018 | Corato et al. |
| D819,806 S | 6/2018 | Koehler et al. |
| D828,920 S | 9/2018 | Koehler et al. |
| 10,092,243 B2 * | 10/2018 | Mirza .................. A61B 1/0004 |
| D848,616 S | 5/2019 | Mcneill et al. |
| D849,099 S | 5/2019 | Patrick et al. |
| D856,393 S | 8/2019 | Patrick et al. |
| D858,609 S | 9/2019 | Meneses et al. |
| D890,924 S | 7/2020 | Godinez et al. |
| 10,758,666 B1 | 9/2020 | Schultz |
| 11,096,627 B2 * | 8/2021 | Perkins .................. H04N 7/185 |
| D959,661 S | 8/2022 | Englert et al. |
| D978,347 S | 2/2023 | Mclellan et al. |
| 11,766,122 B1 * | 9/2023 | Fan .......................... F16B 2/12 248/231.71 |
| D1,005,483 S | 11/2023 | Kramer et al. |
| D1,010,816 S | 1/2024 | Cook et al. |
| D1,019,390 S | 3/2024 | O'donnell et al. |
| 2008/0116340 A1 * | 5/2008 | Greene ................ F16M 13/022 248/229.15 |
| 2013/0107109 A1 | 5/2013 | Yang et al. |
| 2013/0300919 A1 * | 11/2013 | Fletcher ............... H04N 17/002 348/360 |
| 2014/0378937 A1 | 12/2014 | Anderson et al. |
| 2021/0068645 A1 | 3/2021 | Elson et al. |
| 2021/0068646 A1 * | 3/2021 | Zhang .................. A61B 1/0684 |
| 2022/0000342 A1 | 1/2022 | Knecht et al. |

FOREIGN PATENT DOCUMENTS

| | | |
|---|---|---|
| CN | 205625871 U | 10/2016 |
| CN | 109151124 A | 1/2019 |
| CN | 308537643 S | 3/2024 |
| WO | WO 2018-010849 A1 | 1/2018 |
| WO | 2019226395 A1 | 11/2019 |

OTHER PUBLICATIONS

Youtube, "Introducing SmartCheck from Children's Tylenol Digital Ear Scope Otoscope", Available online at: "https://www.youtube.com/watch?v=er_UyRyfcDQ", Feb. 11, 2022, 1 Page.

* cited by examiner

SYSTEMS, METHODS, AND APPARATUS FOR ATTACHING AN OTOSCOPE

CROSS-REFERENCE TO RELATED APPLICATIONS

This application claims the benefit of U.S. Provisional Application No. 63/047,400, filed on Jul. 2, 2020, the contents of which are incorporated by reference in their entirety herein.

BACKGROUND

An otoscope may be used for diagnosing identifying problems of the outer ear and/or middle ear, such as issues with a tympanic membrane, or an ear infection (e.g., acute otitis media). When joined with a camera, the otoscope may be used for remote diagnosis when images or videos may be recorded by the user. For example, the otoscope may be used for tele-otoscopy and may enable a user to record an image of an ear canal of a patient (e.g., an image of the tympanic membrane). And the image may be sent to a remote physician for diagnosis. But the user may not be able to align the camera with the otoscope such that a clear picture or a clear video may be taken.

SUMMARY

Disclosed herein are systems, methods, and apparatus, for attaching and/or aligning a removable optical element, such as an otoscope, to a smart device, such as a smart phone. A user may be provided with an ability to align a camera of the smart device with the otoscope in such a way that a picture or video (e.g., a clear picture or a clear video) may be taken.

A clip may be provided that may be attached to an otoscope to form an otoscope clip device. The otoscope clip may include a clamp, which may open and close using a screw clamp assembly. The screw clamp assembly may allow a user to align a viewing portion of the otoscope with a camera of a smart device. The screw clamp assembly may allow a user to tune (e.g., finely tune) the alignment of the otoscope clip such that the viewing portion of the otoscope may be aligned with the camera of the smart device.

The clip may include an alignment tab, which may be used to align the viewing portion of the otoscope with the camera of the smart device. For example, an alignment image may be presented on the smart device that may cause the viewing portion of the otoscope to be aligned with the camera of the smart device when the alignment tab is placed on, near, over, and/or aligned with the alignment image. The alignment image may be an on-screen alignment image, and indicator, a marker, an icon, an etching, and/or the like. The alignment image may be an outline of the alignment tab or other shape that may assist in the alignment of the viewing portion of the otoscope with the camera of the smart device.

A user may attach the otoscope clip to the smart device, may align a portion of the otoscope with the camera of the smart device using the alignment rah, and may secure the otoscope clip to the smart device using the screw clamp assembly to close the clamp. The user may then record an image of an outer ear, a middle ear, and/or an ear canal of a patient and may provide that image to a physician for diagnosis. The recorded image may be analyzed by software on the smart device that may work in conjunction with the otoscope clip to provide image analysis, medical analysis, diagnosis, image taking guidance, and/or the like.

A device may be provided for attaching a movable optical element, such as an otoscope, to a smart phone. The device may comprise a main body. The main body may comprise an aperture and a first engagement member that may be configured to engage with a second engagement member that belongs to a movable optical element. The movable optical element may be an otoscope. The device may comprise a first surface connected to the main body. The first surface may be configured to contact a first smart phone surface. The first smart phone surface may be a back side of the smart phone that may comprise a camera. The device may comprise a piston. The piston may comprise a second surface that may be parallel to the first surface and may be configured to contact a second smart phone surface. The second smart phone surface may be a front side of the smart phone that may comprise a smart phone screen. The device may comprise a threaded knob that may be connected to the piston through the aperture. The threaded knob may be configured to move the piston in a direction relative to the first surface when turned. For example, the knob may comprise a reverse thread such that when the threaded knob is turned in a clockwise direction, the second surface may move towards the first surface. When the threaded knob is turned in a counterclockwise direction, the second surface may move away from the first surface.

A device may be provided for attaching a moveable optical element to a smart phone. The device may comprise a main body. The main body may comprise an aperture and a first engagement member. The first engagement member may be configured to engage with a second engagement member in a first position or a second position. The second engagement member may belong to the movable optical element. The device may comprise a first surface that may be connected to the main body and may be configured to contact a first smart phone surface. The first smart phone surface may be a back side of the smart phone where a camera of the smart phone may be located. The device may comprise a piston. The piston may comprise a shaft, a second surface, and a third surface. The second surface may be parallel to the first surface and may be configured to contact a second smart phone surface. The second smart phone surface may be a display of the smart phone. The third surface may comprise a protrusion for aligning a viewing portion of the moveable optical element with a camera lens of the smart phone in a first axis. The device may compose a knob connected to the shaft through the aperture.

A device may be provided for attaching an otoscope to a smart phone. The device may comprise a main body. The main body may comprise an aperture and an engagement member configured to engage with a moveable otoscope in a first position or a second position. The device may comprise a first surface that may be connected to the main body and may be configured to contact a first smart phone surface. The first smart phone surface may be a back side of the smart phone which may be where a camera of the smart photic may be located. The device may comprise a piston. The piston may comprise a shaft and a second surface. The second surface may be parallel to the first surface and may be configured to contact a second smart phone surface. The second smart phone surface may be a display of the smart phone. The device may comprise a threaded knob connected to the shaft through the aperture. The threaded knob may comprise a reverse thread. The threaded knob may be configured to move the piston in a direction relative to the first surface when turned. For example, when the knob is turned in a clockwise direction, the first surface may travel towards the second surface such that the first surface and the second surface may contact the smart phone and may allow the device to clamp onto the smart phone. When the knob is turned in a counterclockwise direction, the first surface may travel away from the second surface such that the first surface and the second surface may lose contact with the smart phone.

The first surface and/or the second surface may comprise an anti-skid material that may prevent slippage. The first surface and/or the second surface may comprise a material that may protect a phone surface. For example, the first surface and/or the second surface may prevent the phone surface from damage. The first surface and/or the second surface may be or may comprise a gasket. The gasket may prevent slippage, may protect a phone surface, may act as a light block to prevent light from leaking from the otoscope clip device, may prevent light from entering the otoscope clip device optics, and/or may act as a light block to prevent light from entering a camera of the smart phone.

A method may be provided for attaching an otoscope clip device to a smart device. A smart device may be placed in between a first surface of the otoscope clip device and a second surface of the otoscope clip device. An alignment tab of the otoscope clip device may be aligned with an alignment image that may be on a display of the smart device. A threaded knob of the otoscope clip device may be rotated to cause the first surface of the otoscope clip device to contact the display and the second surface of the otoscope clip device to contact a back surface of the smart device.

DETAILED DESCRIPTION

Figure 1A:
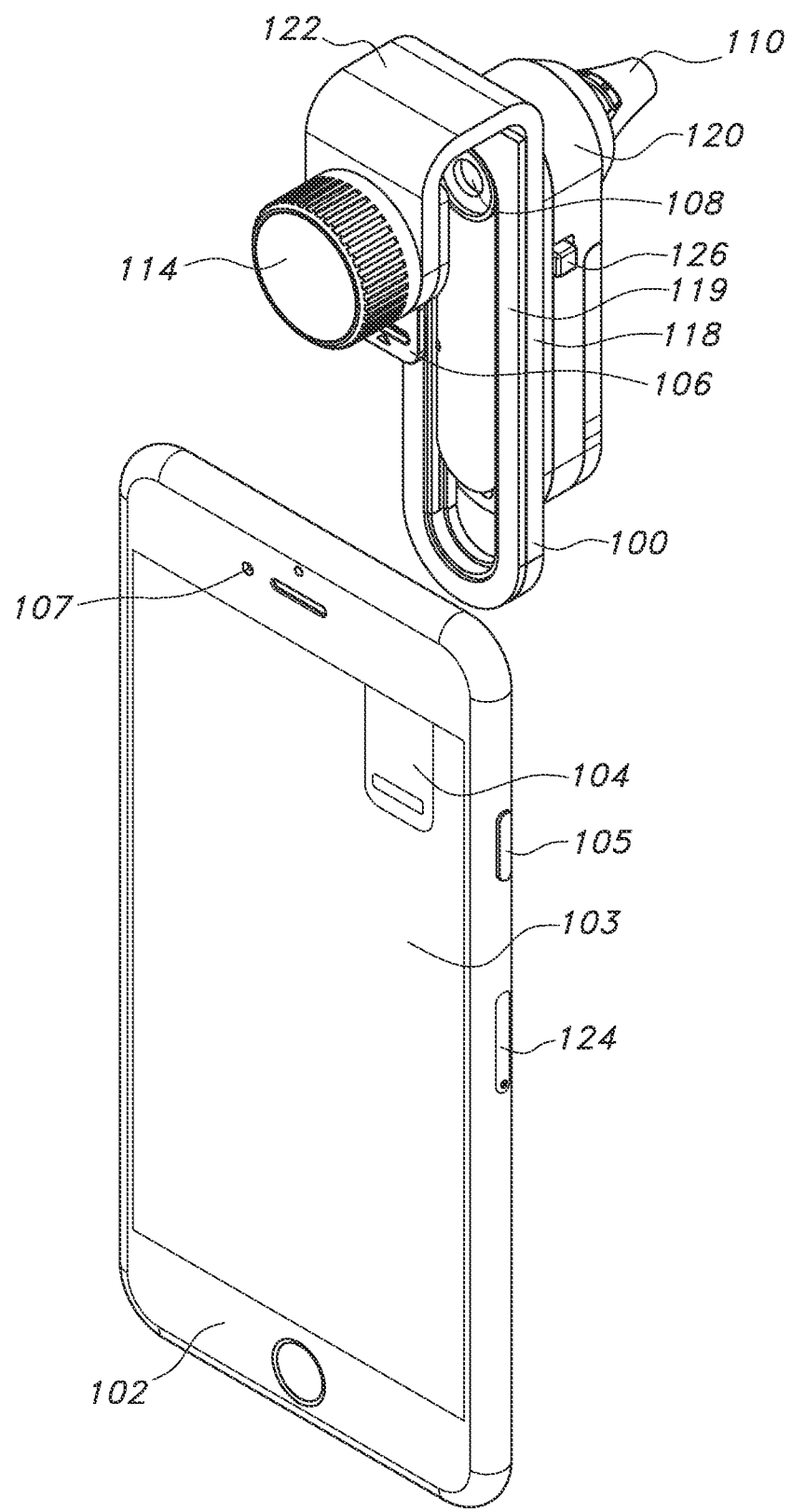
FIGS. 1A-B depict perspective views of an otoscope clip device that is detached from a smart device, such as a smart phone.

As remote medicine (e.g., tele-medicine) becomes more common, devices may allow individuals to perform tasks to assist doctors, nurses, or other medical practitioners. For example, a user may take a picture or a video within the ear canal of a patient (e.g., an image of the tympanic membrane), so that a remote doctor may diagnose an issue with the outer ear and/or middle ear of the patient. To assist in raking a picture or a video of the outer ear and/or middle ear, a user may use an otoscope. For example, a user may connect an otoscope to a camera.

Disclosed herein are systems, methods, and apparatus, for attaching an otoscope to a smart device, such as a smart phone. A user may be provided with an ability to align a camera of the smart device with the otoscope in such a way that a picture or a video (e.g., a clear picture or a clear video) may be taken.

A clip may be provided that may be attached to an otoscope to form an otoscope clip device. The otoscope clip may include a screw clamp assembly (e.g., a clamp), which may open and close using a screw mechanism. The screw clamp assembly may allow a user to align a viewing portion of rive otoscope with a camera of a smart device. The screw clamp assembly may allow a user to tune (e.g., finely tune) the alignment of the otoscope clip such that the viewing portion of the otoscope may be aligned with the camera of the smart device.

The clip may include an alignment tab, which may be used to align the viewing portion of the otoscope with the camera of the smart device. For example, an alignment image may be presented on the smart device that may cause the viewing portion of the otoscope to be aligned with the camera of the smart device when the alignment tab is placed over and/or aligned with the alignment image. The alignment image may be an on-screen alignment image, and indicator, a marker, a combination thereof, and/or the like. The alignment image may be an outline of the alignment tab or other shape that may assist in the alignment of the viewing portion of the otoscope with the camera of the smart device.

A user may attach the otoscope clip to the smart device, may align a portion of the otoscope with the camera of the smart device using the alignment tab, and may secure the otoscope clip to the smart device using the screw clamp assembly to close the clamp. The user may then record an image of an outer ear, a middle ear, and/or an inner ear of a patient and may provide that image to a physician for diagnosis. The recorded image may be analyzed by software on the smart device that may work in conjunction with the otoscope clip to provide image analysis, medical analysis, diagnosis, image raking guidance, and/or the like.

A device may be provided for attaching a movable optical element, such as an otoscope, to a smart phone. The device may comprise a main body. The main body may comprise an aperture and a first engagement member that may be configured to engage with a second engagement structure that belongs to a movable optical element. The movable optical element may be an otoscope. The device may comprise a first surface connected to the main body. The first surface may be configured to contact a first smart phone surface. The first smart phone surface may be a back side of the smart phone that may comprise a camera. The device may compose a piston. The piston may comprise a shaft with a threaded hole and a keyway. The piston may comprise a second surface that may be parallel to the first surface and may be configured to contact a second smart phone surface. The second smart phone surface may be a front side of the smart phone that may comprise a smart phone screen. The device may comprise a threaded knob that may be connected to the piston through the aperture. The threaded knob may comprise a reverse thread. The threaded knob may be configured to move the piston in a direction relative to the first surface when turned.

The first surface may be a first non scratch surface. The second surface may be a second non-scratch surface. A non-scratch surface may be comprised of materials that prevent scratching or damaging another surface, such as a display screen. The materials may be rubber, plastic, fabric, a laminate, and/or the like. The first surface and/or the second surface may be or may comprise a gasket. The gasket may prevent slippage, may protect a phone surface, may act as a light block to prevent light from leaking from the otoscope clip device, may prevent light from entering the otoscope clip device optics, and/or may act as a light block to prevent light from entering a camera of the smart phone.

The main body of the device may comprise a number of apertures. For example, the main body may comprise a first aperture that may be a hub that may comprise a key that may be complementary to a keyway belonging to a shaft of the piston. The main body may comprise a second aperture that may be configured to be aligned with a viewing portion of the movable optical element.

The piston may further comprise a third surface with an outer edge for aligning a viewing portion of the removable optical element with a camera lens of the smart phone. For example, the outer edge of the third surface may be designed such that its shape may assist a user in aligning the optical element with the camera lens of the smart phone.

A device may be provided for attaching a moveable optical element to a smart phone. The device may comprise a main body. The main body may comprise an aperture and a first engagement member. The first engagement member may be configured to engage with a second engagement member in a first position or a second position. The second engagement member belonging to a movable optical element. The device may comprise a first surface that may be connected to the main body and may be configured to contact a first smart phone surface. The first smart phone surface may be a back side of the smart phone where a camera of the smart phone may be located. The device may comprise a piston. The piston may comprise a shaft, a second surface, and a third surface. The second surface may be parallel to the first surface and may be configured to contact a second smart phone surface. The second smart phone surface may be a display of the smart phone. The third surface may comprise a protrusion for aligning a viewing portion of the moveable optical element with a camera lens of the smart phone in a first axis. The protrusion may be a protrusion that may correspond to a detent indentation to assist in securing an alignment.

The device may comprise a knob connected to the shaft through the aperture. The threaded knob may be connected to the piston through the aperture. The threaded knob may be configured to move the piston in a direction relative to the first surface when turned. For example, turning the threaded knob may cause the piston to move the first surface towards the second surface such that the first surface and the second surface may contact the smart phone. This may allow the device to clamp onto the smart phone.

The moveable optical element may be an otoscope. The main body composes a top portion and a bottom portion. The first engagement member may be connected to the main body and may be configured to engage with the second engagement member in the first position or the second position. The second engagement member may belong to the movable optical element. The first position may be within the top portion and the second position may be within the bottom portion. For example, the movable optical element may be moved to the first position, which may be the top portion of the main body. As another example, the movable optical element may be moved to the second position, which may be the bottom portion of the main body. This may be done, for example, to allow a camera of the smart phone to be aligned with a viewing portion of the movable optical element.

The third surface of the piston may allow a user to align a viewing portion of the movable optical element with a camera of the smart phone. The third surface may comprise a number of physical features to assist in aligning the viewing portion of the movable optical element with the camera of the smart phone. The third surface may comprise an alignment aperture for aligning the viewing portion of the moveable optical element with the camera lens in a second axis. The third surface may comprise a color that may match an alignment image that to be displayed on the smart phone. The third surface may comprise an outer edge that complements an alignment image to be displayed on the smart phone.

A device may be provided for attaching an otoscope to a smart phone. The device may comprise a main body. The main body may comprise an aperture and an engagement member configured to engage with a moveable otoscope in a first position or a second position. The device may comprise a first surface that may be connected to the main body and may be configured to contact a first smart phone surface. The first smart phone surface may be a back side, of the smart phone which may be where a camera of tire smart phone may be located. The device may comprise a piston. The piston may comprise a shaft and a second surface. The second surface may be parallel to the first surface and may be configured to contact a second smart phone surface. The second smart phono surface may be a display of the smart phone. The device may comprise a threaded knob connected to the shaft through the aperture. The threaded knob may be configured to move the piston in a direction relative to the first surface when turned, for example, when the knob is turned, the first surface may travel towards the second surface such that the first surface and the second surface may contact the smart phone and may allow the device to clamp on to the smart phone.

The otoscope may comprise a removable speculum. The otoscope may comprise a light. The light may an incandescent light, a light emitting diode (LED), and/or the like. The light may be powered by a battery, such as a lithium ion battery, an alkaline battery, and/or the like.

The main body of the device may comprise a number of apertures. For example, the main body may comprise a first aperture that may be a hub and that may comprise a key that may be complementary to a keyway that may belong to a shaft of the piston. The shaft may comprise a threaded hole to allow the knob, which may comprise a threaded protrusion, to be connected to the shaft of the piston. In an example, the main body may comprise a second aperture that may be configured to be aligned with a viewing portion of the movable otoscope in a first position or in a second position.

A method may be provided for attaching an otoscope clip device to a smart device. A smart device may be placed in between a first surface of the otoscope clip device and a second surface of the otoscope clip device. The otoscope clip device may compose an otoscope. An alignment tab of the otoscope clip device may be aligned with an alignment image that may be on a display of the smart device. A threaded knob of the otoscope clip device may be rotated to cause the first surface of the otoscope clip device to contact the display and the second surface of the otoscope clip device to contact a back surface of the smart device. The back surface of the smart device may comprise a camera of the smart device. A video and/or image of the view through the otoscope of the otoscope clip device may be viewed on the display. An alignment of the otoscope with a camera of the smart device may be adjusted. A video and/or image of a view through the otoscope of the otoscope clip device may be recorded.

Aligning the alignment tab of the otoscope device with the alignment image of the display of the smart device may align the otoscope with the camera of a smart device. Aligning the alignment tab of the otoscope device with the alignment image of the display of the smart device may comprise a number of actions. A first alignment tab feature of the alignment tab may be aligned with a first object within the alignment image on the display of the smart device to vertically align tire otoscope with the camera. A second alignment tab feature of the alignment tab may be aligned with a second object within the alignment image on the display of the smart device to horizontally align the otoscope with the camera. An outer edge of the alignment tab may be aligned with an outline of the alignment image. At least one of the first alignment tab feature and the second alignment tab feature may comprise at least one of a protrusion, a hole, an aperture, a color, a design, an icon, an etching, a symbol, a window, and/or a clear portion of the alignment tab.

The otoscope of the otoscope clip device may be moved into a first position or a second position within the otoscope clip device to assist with aligning the otoscope with a camera of the smart device. The otoscope of the otoscope clip device may be moved into a lower position within the otoscope clip device to assist with aligning the otoscope with a camera of the smart device. The otoscope of the otoscope clip device may lie moved into an upper position within the otoscope clip device to assist with aligning the otoscope with a camera of the smart device.

A smart device may be used to provide a camera for an otoscope. The smart device may be a smart phone, a smart tablet (e.g., an iPad), a computer, and/or the like. The smart device may include a camera, which may be used by the otoscope to take an image. The camera on the smart phone may provide a cost-effective method of providing the otoscope with the camera. For example, smart phones may now be widely available, and users may already have access to one. By providing a user with a device, such as an otoscope clip device, to attach an otoscope to the smart phone, the user may be given the ability to use the otoscope to take images which may then be sent to a medical professional.

When attaching an otoscope to a smart phone with the otoscope clip, the user may wish to align the otoscope with the camera on the smart phone. Aligning the otoscope with the smart phone camera may provide an image that may not be impeded by a component of the otoscope. Aligning the otoscope with the smart phone camera may help keep stray light out of the image (e.g., seal light our of the otoscope) to improve an image quality. To align the otoscope with the camera on the smart phone, a user may have to flip the phone back and forth as the smart phone camera may be on the opposite side of the display.

To minimize flipping the phone back and forth during a camera alignment, an overlay or image may be projected onto the screen of the smart phone. The overlay may be referred to as an alignment image. The alignment image may be complementary to an alignment feature, such as an alignment tab, on the otoscope clip such that a user may align the alignment image with the alignment tab. When the alignment image is aligned with the alignment tab, the viewing portion of the otoscope may be aligned with the smart phone camera Aligning the alignment image with the alignment tab may also allow the user to align the otoscope with the smart phone camera while minimizing turning the phone back and forth during the alignment.

The alignment image may encourage the user to correctly attach the otoscope to the smart phone using the otoscope clip device. For example, the alignment image may be placed at the top of the smart phone to encourage the user to attach the otoscope. The alignment image may be placed at a position on the smart phone to encourage the user to place the otoscope clip over the top of the smart phone. The alignment image may be displayed in such a way as to encourage the user to attached the otoscope clip so that the otoscope clip may not impede one or more buttons of the smart phone when the otoscope clip is attached to the smart phone.

The otoscope clip device may be designed to provide better ergonomics for a user. For example, the otoscope clip device may be designed to improve how a user may be holding a smart device. The otoscope clip may be designed to avoid impeding the ability of the user to place the otoscope in an ear of a patient. The otoscope clip may be designed to encourage a user to correctly place the otoscope in an ear of the patient. For example, the clip may be designed to allow a user to rest their hand against a head of a patient while using the otoscope attached to the smart phone via the otoscope clip.

The otoscope clip may be designed to provide a secure method of attachment to the smart device and may be designed to be attached to a number of different styles of smart phones. The otoscope clip may comprise a clamp assembly that may be used to secure the otoscope clip to the smartphone. The clamp assembly may assist in minimizing the movement of the otoscope during the process of taking an image. For example, the clamp assembly may minimize movement of the clip along an axis of a surface of the smart phone to improve the ability of a user to align the viewing portion of the otoscope with the camera of the smart phone.

The otoscope clip may be designed to avoid compressing one or mote buttons of the smart phone. The otoscope clip may be designed to prevent a user from accidentally pressing one or more buttons of the smart phone. For example, the clip may avoid compressing the on/off switch, may avoid compressing a volume switch, may prevent a user from pressing the on/off switch, may prevent a user from pressing a volume switch, and/or the like.

Figure 1B:
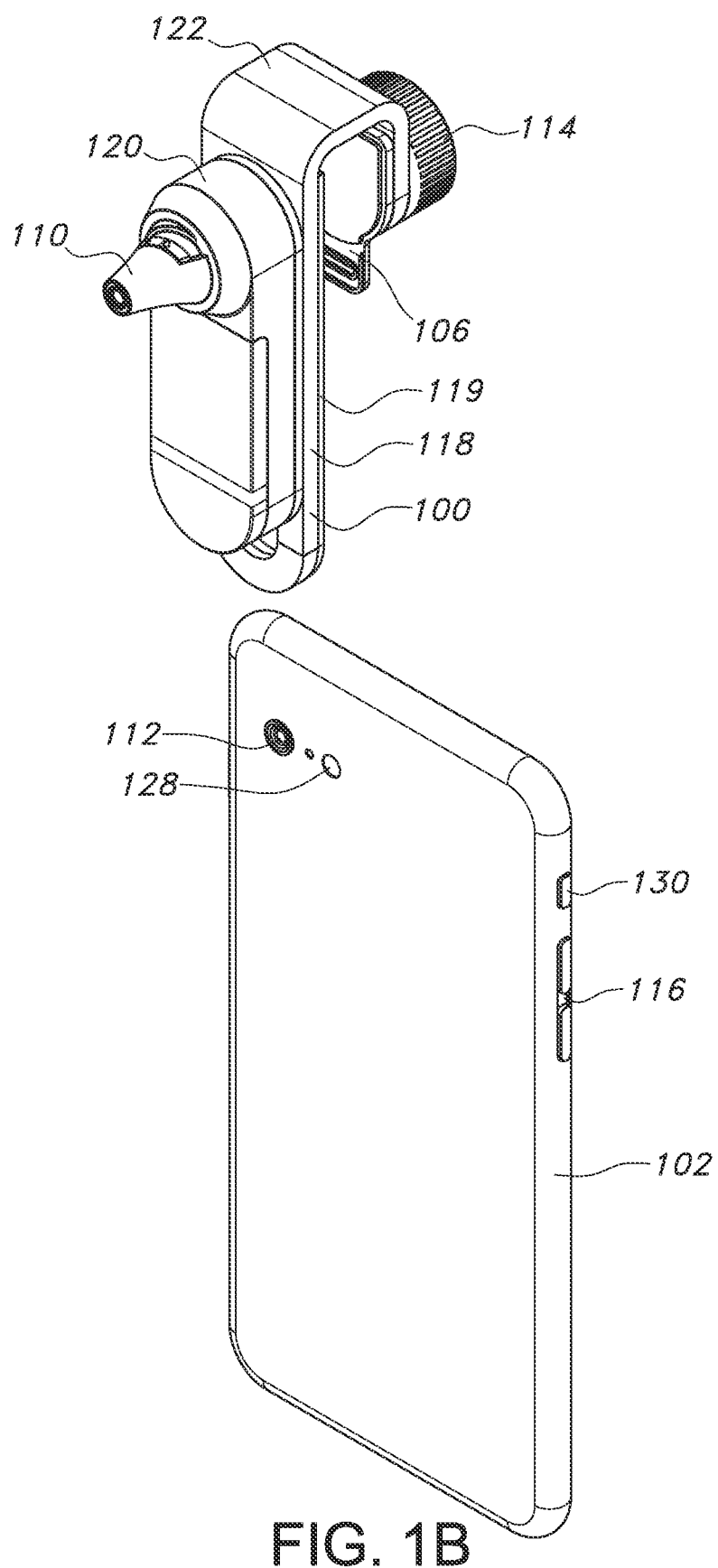

FIGS. 1A-B depict perspective views of an otoscope clip device that is detached from a smart device, such as a smart phone. As shown in FIG. 1A, otoscope clip device 100 may be detached from smart device 102. FIG. 1A may depict the front side of smart device 102, and a back side of the otoscope clip device 100. The back side of the otoscope clip device 100 may comprise a knob, such as knob 114, and an alignment tab, such as alignment tab 106. The front side of the smart device may comprise a camera, such as the camera 107, which may be directed towards a user, and a display screen, such as display 103. Front side of the smart device may comprise a button, such as a home button, and a speaker, which may be used by a user to listen to a phone call. Button 105 may be located on a side of smart device 102.

Smart device 102 may be a smart phone, a smart tablet (e.g., an iPad), a computer, and/or the like. The smart device may comprise a display, such as display 103. The display 103 may be a liquid crystal display (LCD) and may be located on the front facing portion of the smart device. The display 103 may show an alignment image 104. The alignment image 104 may assist the user in aligning a viewing portion of an otoscope with a camera of the smart device, such as the camera at 112 showing with respect to FIG. 1B.

Referring again to FIG. 1A, the alignment image 104 may be complementary to an alignment feature, such as the alignment tab 106, on the otoscope clip device 100 such that a user may align the alignment image 104 with the alignment tab 106. When the alignment image 104 is aligned with the alignment tab 106, the viewing portion 108 of the otoscope may be aligned with the smart device camera 112. Aligning the alignment image 104 with the alignment tab 106 may allow the user to align the viewing portion 108 of the otoscope with the smart device camera 112 while minimizing turning the phone back and forth during the alignment.

The otoscope clip device 100 may comprise a number of components. For example, the otoscope clip device 100 may comprise the clip assembly 122 and/or the otoscope assembly 120.

The otoscope clip device 100 may comprise alignment tab 106. The alignment tab may be a part of the clip assembly 122. The alignment tab 106 may include one or more features to assist in the alignment of the viewing portion 108 of the otoscope. The one or more features may include a protrusion, a hole, an aperture, a color, a design, an icon, an etching (e.g., a laser etching), a symbol, and/or the like.

The alignment tab 106 may include one or more alignment protrusions. An alignment protrusion of the one or more alignment protrusions may be a protrusion on a surface of the alignment tab 106 that may be aligned with a portion of alignment image 104. For example, alignment tab 106 may include an arrow shaped alignment protrusion that may be aligned with a line within a portion of the alignment image 104.

The alignment tab 106 may include an alignment design. The alignment design may be an etching on a surface of the alignment tab 106 to assist in the alignment of the viewing portion 108 of the otoscope. For example, the alignment design may be one or more intersecting lines, such as a crosshair, that when aligned with an alignment image on a smart device may align the viewing portion 108 of the otoscope with a camera of the smart device.

The alignment tab 106 may include an outer edge that may be aligned with an outer edge of the alignment image 104. The outer edge of the alignment tab 106 may be a shape that may be complementary to the outer edge of the alignment image 104. When the outer edge of the alignment tab 106 is aligned with the outer edge of the alignment image 104, the viewing portion 108 of the otoscope may be aligned with the camera of the smart device.

Alignment tab 106 may include an aperture that may be aligned with an object within alignment image 104. For example, the aperture of alignment tab 106 may align with a bullseye target on alignment image 104, an oval shape within alignment image 104, a line within alignment image 104, a combination thereof, and/or the like. The alignment aperture may assist in the alignment of the viewing portion 108 of the otoscope. For example, the alignment aperture may cause the viewing portion 108 of the otoscope to be aligned with a camera of the smart device when the alignment aperture is aligned with a corresponding shape within an image on a display of the smart device.

The alignment tab 106 may be made of a material of a color that may match a color of alignment image 104. The alignment tab 106 may be made of a material of a color that may be complementary to a color of alignment image 104. The alignment tab 106 may be made of a clear material such that a user may see through the clear material and align the alignment tab 106 with the alignment image 104. The alignment tab 106 may be made of a material, such as a resilient material, that may be able to apply a pressure to a surface of the smart phone. For example, alignment tab 106 may be made of plastic, metal, a polymer, and/or the like.

Alignment tab 106 may be placed in a parallel position to another surface of otoscope clip device 100, such as a surface of clip engagement member 118. Alignment tab 106 may be placed in a parallel position to and/or surface of the otoscope clip device 100 such that the otoscope clip device 100 may form a c-shape. The c-shape that may be formed using the parallel position of alignment tab 106 with another surface of the otoscope clip device 100, such as a surface of clip engagement member 118, and may be used to provide a clamp, such as a c-clamp. The clamp may be driven by a knob, such as the knob 114.

The otoscope clip device 100 may comprise knob 114, which may be a knob that may drive a screw clamp assembly. Knob 114 may be a part of the clip assembly 122. Knob 114 may be a cylindrical shape with a flat top surface, a bottom surface with at least a hole, and an outer surface. The outer surface of knob 114 may include a number of splines, knurling, or other texture which may provide a gripping surface. When turned, knob 114 may engage a screw clamp assembly such that a piston that may include alignment tab 106 may be moved towards a surface that is parallel to alignment tab 106. For example, a user may turn knob 114 so that alignment tab 106 moves towards a parallel surface of otoscope clip device 100. Knob 114 may cause the alignment tab 106 to move towards clip engagement member 118 such that alignment tab 106 and the clip engagement member 118 may clamp onto the smart device 102.

The otoscope clip device 100 may comprise clip engagement member 118. The clip engagement member 118 may be part of the clip assembly 122. The clip engagement member 118 may have a first surface and a second surface. The first surface of the clip engagement member 118 may face the back side of smart device 102. The first surface of the clip engagement member 118 may include an anti-skid material, and/or an anti-scratch material. For example, the first surface of the clip engagement member 118 may be made of rubber to prevent scratching and/or damage to smart device 102, and to prevent otoscope clip device 100 from moving when it is attached to the smart device 102. The clip engagement member 118 may include an elongated aperture. The elongated aperture may allow viewing portion 108 to protrude into or through the clip engagement member 118. This may allow viewing portion 108 to be moved into a number of positions such that viewing portion 108 may be aligned with smart device camera 112.

The clip engagement member 118 may include a number of features to allow the viewing portion 108 to be placed in one or more positions. For example, the clip engagement member 118 may include a protrusion in a side of clip engagement member 118 that may have a complimentary notch in the otoscope assembly 120, which may allow the otoscope assembly 120 and/or the viewing portion of the otoscope to be locked in a position.

The clip engagement member 118 may allow the otoscope assembly 120 to be attached and/or connected to clip assembly 122. The clip engagement member 118 may be a portion of a c-clamp that is part of clip assembly 112, lire clip engagement member 118 may allow the otoscope assembly 120 to be movably attached to clip assembly 122. For example, clip engagement member 118 may allow otoscope assembly 120 to move into one or more positions within clip assembly 122. The clip engagement member 118 may allow the otoscope assembly 120 to be removably attachable to clip assembly 122. For example, clip engagement member 118 may allow otoscope assembly 120 to be attached to and/or removed from clip assembly 122.

The contact surface 119 may be in contact with the clip engagement member 118. The contact surface 119 may comprise an anti-skid material that may prevent slippage. The contact surface 119 may be or may comprise a gasket. The gasket may prevent slippage, may protect a phone surface, and/or may acts as a light block to prevent light leakage from the device. For example, the gasket may prevent ambient light from entering the optics.

The otoscope clip device 100 may comprise a viewing portion of an otoscope, such as rite viewing portion 108. The viewing portion of rite otoscope may be a part of the otoscope assembly 120. Viewing portion 108 may be where an image may come into focus from usage of the otoscope such that the image may be viewed at viewing portion 108. The viewing portion 108 of the otoscope may be where a user or a camera may look into rite otoscope. For example, the viewing portion 108 may be used to view into an ear of a patient, may be used to take a picture or a video of an outer ear, a middle ear, and/or an ear canal of the patient, and/or the like. As described herein, viewing portion of 108 may come in contact with a camera or may be aligned with a camera.

The otoscope clip device 100 may comprise an otoscope assembly 120. The otoscope assembly 120 may comprise an otoscope. The otoscope assembly 120 may comprise the outer rip housing 110, line otoscope assembly 120 may comprise rive light switch 126. The light switch 126 may control a light that may be within or near outer tip housing 110. For example, the light switch may turn on or off a light, which may be battery powered, that may be seen through an opening in the distal end of the outer tip housing 110. This may be done, for example, to provide light within an outer ear, a middle ear, and/or an ear canal of a patient such that a photo may be taken.

The otoscope clip device 100 may comprise the outer tip housing 110. The outer tip housing 110 may have a distal end with an opening that may peer into an outer ear, a middle ear, and/or an ear canal of a patient when a speculum is attached to the outer clip 110. The outer tip housing 110 may have a proximal end that may be connected to the otoscope assembly 120, line outer tip housing 110 may include a radial slot that may allow a removable speculum to be attached to the outer tip housing 110. For example, the removable speculum may be attached to the outer tip housing 110 via fine radial slot such that the otoscope assembly 120 may be used to take a picture or a video of an outer ear, a middle ear, and/or an ear canal of a patient. The otoscope portion of the otoscope clip device 100 may provide an optic magnification of the outer ear, middle ear, and/or ear canal of the patient.

As shown in FIG. 1B, otoscope clip device 100 may be detached from smart device 102. FIG. 1B may be the back side of the smart device, and a front side of the otoscope clip device 100. The back sale of the smart device 102 may include the light 128, and a smart phone camera, such as the smart device camera 112. The smart device camera 112 may face away from a user when the user is viewing the display screen, such as the display 103, of the smart device 102.

As described here in the otoscope clip device 100 may include the outer tip housing 110. The outer tip housing 110 may include an opening. A removable speculum may attach to and/or cover the outer tip housing 110. When the alignment tab 106 is aligned with the alignment image 104, the outer tip housing 110 may be situated in such a way as to be aligned with smart device camera 112. For example, an opening of the outer tip housing 110 may be aligned with the smart device camera 112, and the viewing portion 108 of the otoscope may be aligned with the smart device camera 112.

Figure 1C:
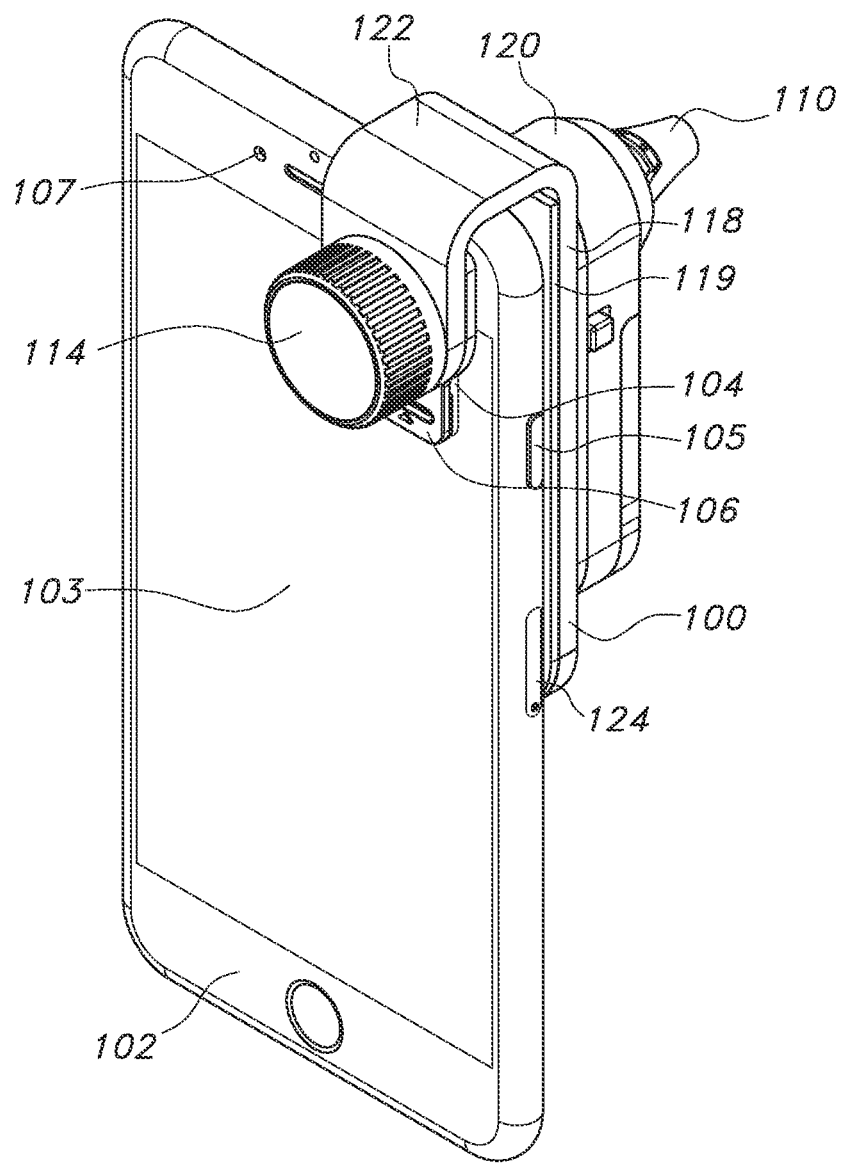
FIGS. 1C-D depict perspective views of an otoscope clip device that is attached to a smart device, such as a smart phone.
Figure 1D:
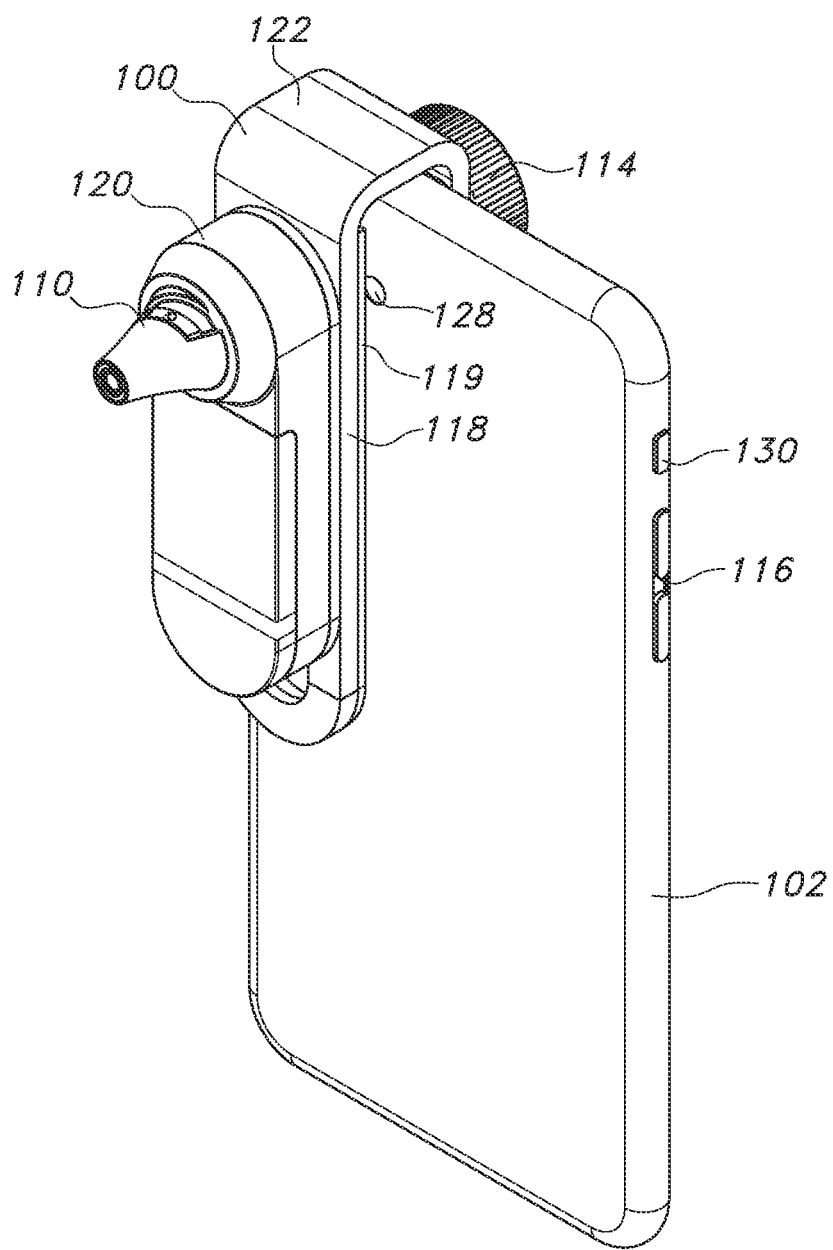

FIGS. 1C-D depict perspective views of an otoscope clip device that is attached to a smart device, such as a smart phone. As shown in FIG. 1C, otoscope clip device 100 may be attached to smart device 102. FIG. 1C may depict the front side of a smart device 102, and the back side of the otoscope clip device 100. The back side of otoscope clip device 100 may comprise a knob, such as 114, an alignment tab, such as alignment fab 106. The front side of the smart device may comprise a camera, such as the camera 107, which may be directed towards the user, and a display screen, such as display 103.

The otoscope clip device 100 may be attached to smart device 102 by clamping mechanism, such as a screw clamp assembly, that may be driven by knob 114. The knob 114 may cause the screw clamp assembly to close when turned. For example, the knob 114 may cause the screw clamp assembly to close when turned in a clockwise direction. The knob 114 may cause the screw clamp assembly to open when turned. For example, the knob 114 may cause the screw clamp assembly to open when turned in a counterclockwise direction. When the screw clamp assembly is closed, the otoscope clip device 100 may be attached to the smart device 102. When the screw clamp assembly is open, the otoscope clip device 100 may be detached from the smart device 102.

When turned, knob 114 may engage a screw clamp assembly such that the screw clamp assembly may close, line knob 114 may cause a piston that may include alignment tab 106 to moved towards a surface that is parallel to alignment tab 106. For example, knob 114 may cause the alignment tab 106 to move towards clip engagement member 118 such that the alignment tab 106 may come in contact with a display of smart device 102 and clip engagement member 118 may come in contact with the back side of smart device 102. The alignment tab 106 and/or the engagement member may include a surface that may come in contact with the display 103. The surface of the alignment tab 106 may be made of a material that may be an anti-scratch and/or anti-skid.

Otoscope clip device 100 may be attached to smart device 102 in such a way as to avoid compressing and/or contacting one or more buttons of smart device 102. Otoscope clip device 100 may attach to smart device 102, such that otoscope clip device 100 may contact one or more of a front face, a back face, and a top portion of smart device 102. Otoscope clip device 100, may be attached in such a way as to avoid contacting the sim card cover 124, the button 105, the volume button 116, the switch 130 (the volume button 116 and the switch 130 may be shown with respect to FIG. 1D) of the smart device 102.

As shown in FIG. 1C, alignment tab 106 may be aligned with alignment image 104 For example, alignment tab 106 may cover alignment image 104. Alignment tab 106 may cover alignment image 104 such that alignment tab 106 may remain within the edges of alignment image 104.

When alignment tab 106 may be within and/or aligned with alignment image 104, the otoscope assembly 120 of otoscope clip device 100 may be aligned with smart device camera 112.

As shown in FIG. 1D, the otoscope assembly 120, the viewing portion 108 of the otoscope, and/or the outer tip housing 110 may be aligned with the smart device camera 112. The otoscope assembly 120 may be aligned with the smart device camera 112 in such a way drat a user may place the otoscope with speculum in an ear of a patient and may take a photo of the outer ear, middle ear, and/or ear canal of the patient. For example, the smart device camera 112 may be able to use the otoscope assembly 120 to view an outer ear, a middle ear, and/or an ear canal of a patient via a sight path that may be established through the viewing portion 108 of the otoscope and through an opening in the outer rip housing 110 and through the attached speculum.

Figure 2:
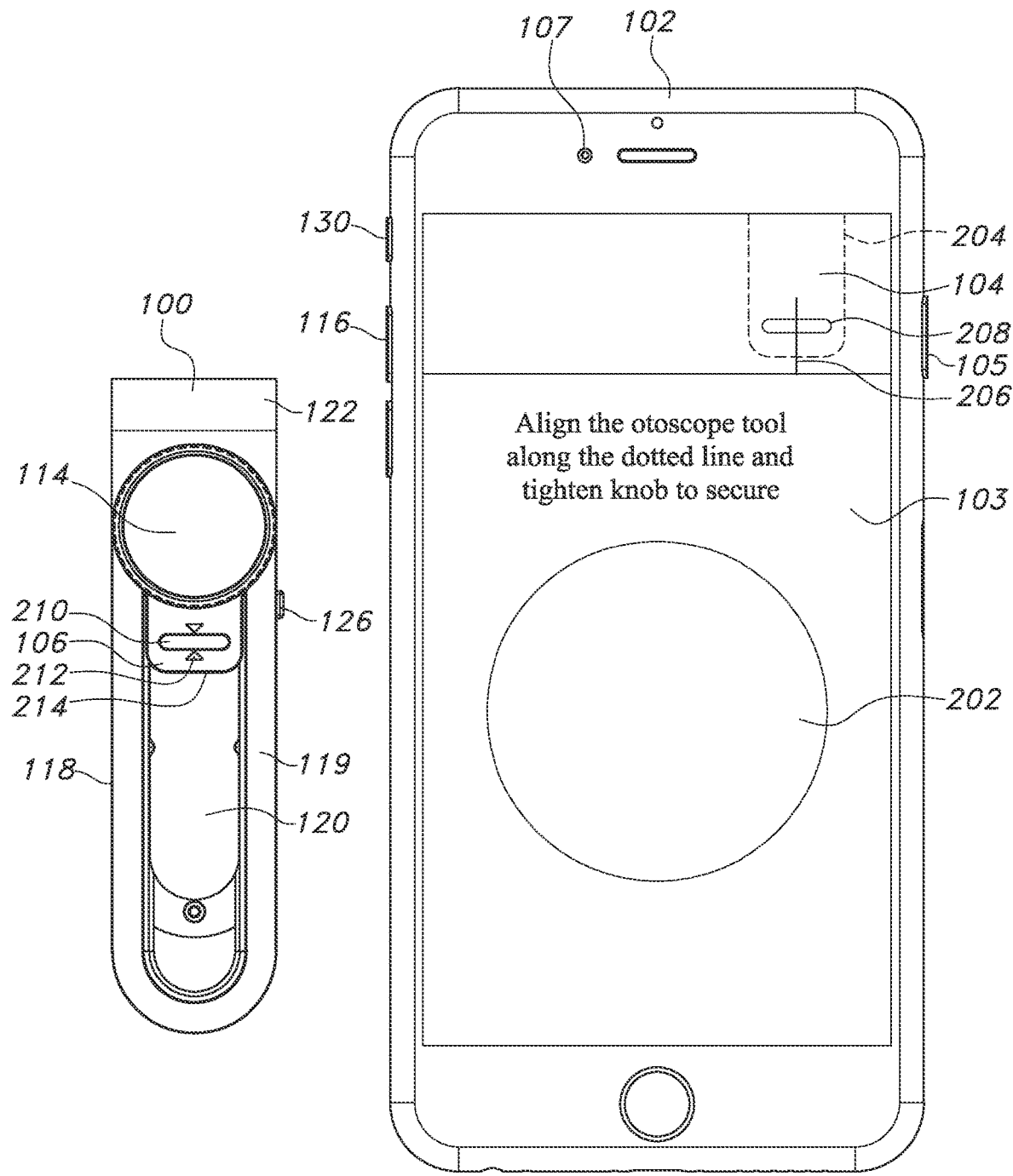
FIG. 2 depicts a perspective view of an otoscope clip device that comprises an alignment tab and a smart device that may comprise a screen that displays an alignment image.

FIG. 2 depicts a perspective view of an otoscope clip device that comprises an alignment tab and a smart device that may comprise a screen that displays and alignment image.

Smart device 102 may comprise a one or more buttons and/or switches. For example, smart device 102 may comprise the switch 130, the volume buttons 116, and the button 105. The smart device may include a camera, such as the camera 107, which may face a user. The smart device may include a display, such as display 103.

Display 103 may provide instructions to a user as to how to align the otoscope clip device 100. Display 103 may include image 202, which may be an image taken from the smart device camera. When otoscope clip device 100 may be attached to smart device 102 an image may be taken. For example, an image may be taken through an otoscope. For example, otoscope clip device 100 may include the otoscope assembly 120. When otoscope clip device 100 is attached to smart device 102, the otoscope assembly 120 may be aligned with a smart device camera and an image or video may be taken through the otoscope associated with the otoscope assembly 120.

Display 103 may display the alignment image 104. The alignment image 104 may be used to assist a user in aligning and otoscope with a smart device camera when the user is attaching the otoscope clip device 100 to smart device 102. The alignment image 104 may depict a shape that may be similar and/or complementary to alignment tab 106 of the otoscope clip device 100. When the alignment tab 106 may be placed within alignment image 104, an otoscope associated with the otoscope assembly 120 may be aligned and/or may be in contact with a smart device camera.

The alignment image 104 may include a number of features that may assist in aligning the alignment image 104 with the alignment tab 106 and/or the otoscope associated with the otoscope assembly 120. These features may include a shape of the alignment image 104, the color of the alignment image 104, a shape within the alignment image 104, an object within the alignment image 104, a color within the alignment image 104, a combination thereof, and/or the like. The alignment image 104 may include the alignment image outline 204, the horizontal alignment image feature 206, the vertical alignment image feature 208, a combination thereof, and/or the like.

The alignment image 104 may be used by a user to determine how to move the otoscope clip device 100 to achieve alignment. Alignment image 104 may be used by the user to determine how to move the otoscope clip device 100 in an axis associated with a plane created by the display 103. For example, display 103 may have a horizontal axis that may cross a first side of smart device 102 that may include volume button 116 to a second side of smart device 102 that may include button 105. Display 103 may have a vertical axis that may be orthogonal to the horizontal axis. The alignment image 104 may provide a user with visual feedback as to how to move the otoscope clip device 100 in the vertical axis and/or the horizontal axis of the display 103, which may align the otoscope with a smart device camera.

The alignment image outline 204 may allow user to align the alignment tab 106 of the otoscope clip device 100 such that the otoscope associated with the otoscope assembly 120 may be aligned with the smart device camera. The alignment image outline 204 may be used by the user to align the alignment tab 106 in the vertical axis and/or the horizontal axis of the display 103. For example, the user may place the alignment tab 106 on, near, or within the alignment image outline 204 and to achieve alignment. It otoscope is misaligned with the smart device camera, a portion of the alignment tab 106 may appear outside of the alignment image outline 204. The user may adjust otoscope clip device 100 to address the portion of the alignment tab 106 that may be outside of the alignment image outline 204 and may align the otoscope with the device camera. By correcting the misalignment of the alignment tab 106 with the alignment image outline 204, the user may correct the alignment of the otoscope with the smart device camera.

The alignment image outline 204 may be larger (e.g., slightly larger) than the alignment rah 106 such that alignment tab 106 may fit within the alignment image 104 and the alignment image outline 204 may be seen. The alignment image outline 204 may be the same or of a similar color to alignment image 104, the alignment tab 106, and/or the alignment tab edge 214. The alignment image outline 204 may be a different color than the alignment image 104, the alignment tab 106, and/or the alignment tab edge 214.

The horizontal alignment image feature 206 may be used by the user to determine how to move the otoscope clip device 100 to achieve alignment. The horizontal alignment image feature 206 may be a line, an object, a shape, an icon, and indicator, and/or the like. For example, the horizontal alignment image feature 206 may be a line elongated in a vertical direction. The horizontal alignment image feature 206 may be within alignment image 104, may be outside alignment image 104, and/or may intersect the alignment image outline 204. The horizontal alignment image feature 206 may be used by a user to determine how to move the otoscope clip device 100 along a horizontal axis associated with the display 103 to horizontally align the otoscope associated with the otoscope assembly 120 with the smart device camera.

To provide guidance as to how to move the otoscope clip device 100 along the horizontal axis, the horizontal alignment image feature 206 may have one or more reference points. For example, the horizontal alignment image feature 206 may be a number of dots along a vertical axis, a line along the vertical axis, a shape elongated along the vertical axis, an indicator along the vertical axis, and/or the like.

To align the otoscope with the smart device camera along the horizontal axis, a user may attach otoscope clip device 100 on smart device 102 such that the horizontal alignment rah feature 212 may be aligned with horizontal alignment image feature 206. For example, the user may align the arrow or triangular protrusions of horizontal alignment tab feature 212 with the line of horizontal alignment image feature 206.

The vertical alignment image feature 208 may be used by the user to determine how to move the otoscope clip device 100 to achieve alignment. The vertical alignment image feature 208 may be a line, an object, a shape, an indicator, an icon, and/or the like. For example, the vertical alignment image feature 208 may be an oval elongated along the horizontal axis. The vertical alignment image feature 208 may be within alignment image 104, may be outside alignment image 104, and/or may intersect rite alignment image outline 204. The vertical alignment image feature 208 may be used by a user to determine how to move the otoscope clip device 100 along the vertical axis associated with the display 103 to vertically align the otoscope associated with the otoscope assembly 120 with the smart device camera.

To provide guidance as to how to move the otoscope clip device 100 along the vertical axis, the vertical alignment image feature 208 may have one or more reference points. For example, the vertical alignment image feature 208 may be a number of dots along a horizontal axis, a line along the horizontal axis, a shape elongated along the horizontal axis, an indicator along the horizontal axis, and/or the like.

To align the otoscope with the smart device camera along the vertical axis, a user may attach otoscope clip device 100 on smart device 102 such that the vertical alignment tab feature 210 may be aligned with vertical alignment image feature 208. For example, the user may align the oval aperture of vertical alignment tab feature 210 with the vertical alignment image feature 208.

Otoscope clip device 100 may comprise the clip assembly 122 and the otoscope assembly 120. The otoscope assembly 120 may include an otoscope and may include a light for the otoscope. The otoscope assembly 120 may include light switch 126 that may control the light for the otoscope. Although a switch is shown with respect to the light switch 126, another suitable element, such as a button, may be used. For example, an On/Off button, a push button, a switch, and/or the like may be used.

The inside portion of the otoscope assembly 120 may be seen in FIG. 2. When otoscope clip device 100 may be attached to smart device 102, the inside portion of otoscope assembly 120 may face and/or contact a back portion of smart device 102 that may include a smart device camera.

The clip assembly 122 may comprise a clamp assembly that may include knob 114. The clip assembly 122 may comprise clip engagement member 118. The clip assembly 122 may comprise alignment tab 106.

The alignment tab 106 may include a number of features that may assist in aligning the alignment tab 106 with the alignment image 104 and/or the otoscope associated with the otoscope assembly 120. These features may include a shape of the alignment tab 106, the color of the alignment tab 106, the shape within the alignment tab 106, an object within the alignment tab 106, a color within the alignment tab 106, a combination thereof, and/or the like. The alignment tab 106 may include the alignment tab edge 214, the horizontal alignment fab feature 212, the vertical alignment tab feature 210, a combination thereof, and/or the like.

The alignment tab 106 may be used by a user as to determine how to move the otoscope clip device 100 to achieve alignment. Alignment tab 106 may be used by a user to determine how to move rite otoscope clip device 100 in an axis associated with a plane created by the display 103. For example, display 103 may have a horizontal axis that may cross a first side of smart device 102 that includes volume button 116 to a second side of smart device 102 that includes button 105. Display 103 may have a vertical axis that may be orthogonal to the horizontal axis. The alignment tab 106 may provide a user with feedback as to how to move the otoscope clip device 100 in the vertical axis or the horizontal axis of the display 103, which may align the otoscope with a smart device camera.

The alignment tab edge 214 may allow user to align the alignment tab 106 of the otoscope clip device 100 such that the otoscope associated with the otoscope assembly 120 may lie aligned with the smart device camera. The alignment tab edge 214 be used by the user to align the alignment tab 106 in the vertical axis and the horizontal axis of the display 103. For example, the user may place the alignment tab edge 214, on, near, or within the alignment image outline 204 and to achieve alignment. If otoscope is misaligned with the smart device camera, a portion of the alignment tab edge 214 may appear outside of the alignment image outline 204. The user may adjust otoscope clip device 100 to address the portion of the alignment tab edge 214 that may be outside of the alignment image outline 204 and may align the otoscope with the device camera By correcting the misalignment of the alignment tab edge 214 with the alignment image outline 204, the user may correct the alignment of the otoscope with the smart device camera.

The alignment tab edge 214 may be an edge of the alignment tab that may be parallel and may be in contact with the phone screen. The alignment tab edge 214 may fit within the alignment image 104 such that the alignment image outline 204 may be seen. The alignment tab edge 214 may be shaped to help reveal the alignment image outline 204 when the alignment tab edge 214 may be placed on top of or over the alignment image outline 204. For example, the alignment tab edge 214 may be created by tapering, chamfering, rounding, or filleting an edge of alignment tab 106. The alignment tab edge 214 may be complementary and/or the same shape as the alignment image outline 204.

The alignment tab edge 214 may be the same color as or a similar color to alignment image 104, the alignment tab 106, and/or the alignment image outline 204. The alignment tab edge 214 may be a different color than the alignment image 104, the alignment tab 106, and/or the alignment image outline 204.

The horizontal alignment tab feature 212 may be used a user to determine how to move the otoscope clip device 100 to achieve alignment. The horizontal alignment tab feature 212 may be a line, an object, a shape, an indicator, an icon, an etching, and/or the like, live horizontal alignment tab feature 212 may be a clear portion or a window of the alignment tab 106. The horizontal alignment tab feature 212 may be an oval elongated in the vertical axis. The horizontal alignment tab feature 212 may be a pill shape elongated along the vertical axis.

The horizontal alignment tab feature 212 may be a first arrow shaped protrusion and a second arrow shaped protrusion that are placed a distance from each other in a vertical direction. The first arrow shaped protrusion and the second arrow shaped protrusion may be designed to point at each other.

In an example, the horizontal alignment tab feature 212 may comprise a first aperture and a second aperture that are a distance from each other. The first aperture and the second aperture may be complementary to one or more objects within the alignment image 104. For example, the first aperture may be aligned with a first circle within the alignment image 104, and the second aperture may be aligned with a second circle within the alignment image 104.

The horizontal alignment tab feature 212 may be aligned with a feature that may be within alignment image 104, may be outside alignment image 104, and/or may intersect the alignment image outline 204. The horizontal alignment tab feature 212 may be used by a user to determine how to move the otoscope clip device 100 along a horizontal axis associated with the display 103 to horizontally align the otoscope associated with the otoscope assembly 120 with the smart device camera.

To provide guidance as to how to move the otoscope clip device 100 along the horizontal axis, the horizontal alignment tab feature 212 may have one or more reference points. For example, the horizontal alignment tab feature 212 may be a number of dots along an axis, a line along the axis, a shape elongated along the axis, an indicator along the axis, and/or the like.

To align the otoscope with the smart device camera along the horizontal axis, a user may attach otoscope clip device 100 on smart device 102 such that the horizontal alignment tab feature 212 may be aligned with horizontal alignment image feature 206. For example, the user may align the arrow or triangular protrusions of horizontal alignment tab feature 212 with the line of horizontal alignment image feature 206.

The vertical alignment tab feature 210 may be used by a user to determine how to move the otoscope clip device 100 to achieve alignment. The vertical alignment tab feature 210 may be a line, an object, a shape, an indicator, an icon, an etching, and/or the like. The vertical alignment tab feature 210 may be a clear portion or a window of the alignment tab 106. The vertical alignment tab feature 210 may be an oval elongated along the horizontal axis. The vertical alignment tab feature 210 may be a pill shape elongated along the horizontal axis. The vertical alignment tab feature 210 may align with a feature that may be within the alignment image 104, may be outside the alignment image 104, and/or may intersect the alignment image outline 204. The vertical alignment tab feature 210 may be used a user to determine how to move the otoscope clip device 100 along the vertical axis associated with the display 103 to vertically align the otoscope associated with the otoscope assembly 120 with the smart device camera.

In an example, the vertical alignment tab feature 210 may comprise a first arrow shaped protrusion and a second arrow shaped protrusion that are placed a distance from each other in a horizontal direction. The first arrow shaped protrusion and the second arrow shaped protrusion may be designed to point at each other.

In another example, the vertical alignment tab feature 210 may comprise a first aperture and a second aperture that are a distance from each other. The first aperture and the second aperture may be complementary to one or more objects within the alignment image 104. For example, the first aperture may be aligned with a first circle within the alignment image 104, and the second aperture may be aligned with a second circle within the alignment image 104.

To provide guidance as to how to move the otoscope clip device 100 along the vertical axis, the vertical alignment tab feature 210 may be one or more reference points. For example, the vertical alignment tab feature 210 may be a number of dots along an axis, a line along the axis, a shape elongated along the axis, an indicator along the axis, and/or the like.

To align the otoscope with the smart device camera along the vertical axis, a user may attach otoscope clip device 100 on smart device 102 such that the vertical alignment tab feature 210 may be aligned with vertical alignment image feature 208. For example, the user may align the oval aperture of vertical alignment tab feature 210 with the vertical alignment image feature 208.

Figure 3A:
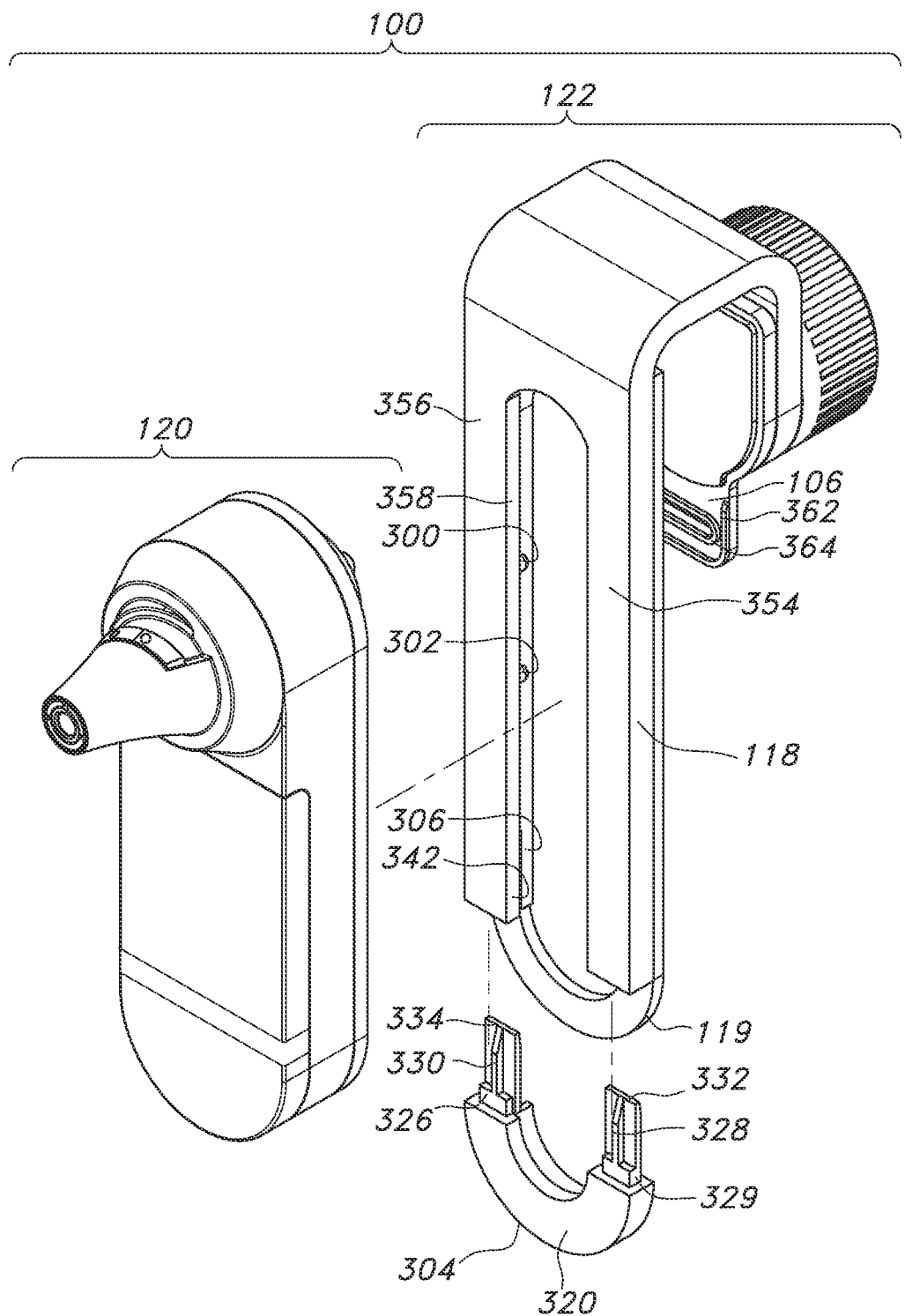
FIGS. 3A-B depict perspective views of an otoscope clip device that may comprise an otoscope assembly and a clip assembly.
Figure 3B:
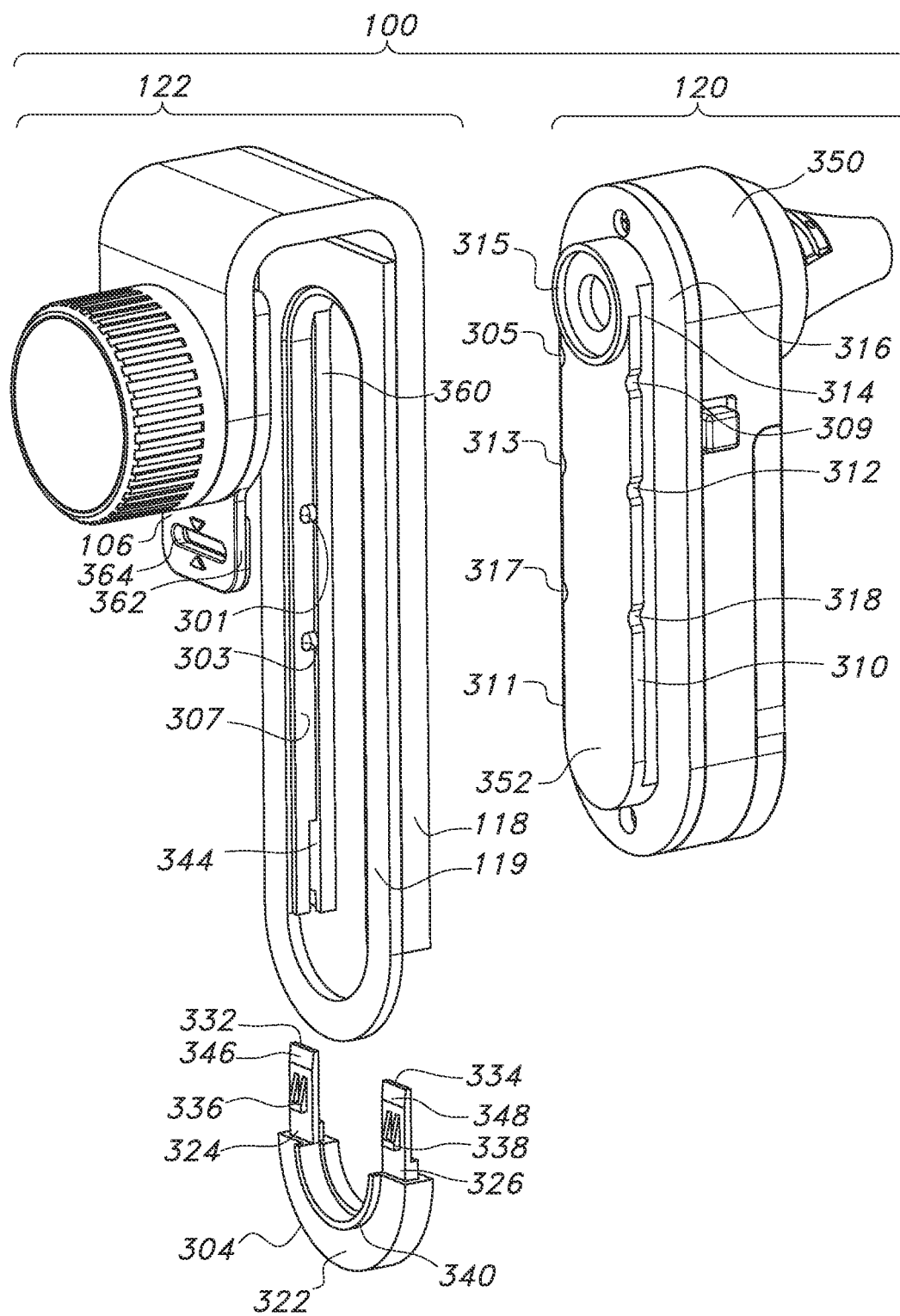

FIGS. 3A-B depict perspective views of an otoscope clip device that may comprise an otoscope assembly and a clip assembly. FIG. 3A shows a first perspective of the otoscope clip device 100. FIG. 3B shows a second perspective of the otoscope clip device 100. As shown in FIGS. 3A-B, the otoscope clip device 100 may comprise otoscope assembly 120, and clip assembly 122.

The otoscope assembly 120 may compose the main body 350, the otoscope back-plate 316, and the otoscope engagement member 352. The otoscope back-plate 316 may be connected to the main body 350. The otoscope engagement member 352 may be connected to the clip assembly 122. For example, the otoscope engagement member 352 may allow the otoscope assembly 120 attach to, connect to, or engage with the clip engagement member 118 of the otoscope clip device 100.

The otoscope engagement member 352 may comprise a guide track, such as guide track 314 and guide track 315. The guide track may be a channel formed in a surface of the otoscope engagement member 352 that may face an inner surface of the clip engagement member 118. The guide track may be a channel in a surface of the otoscope engagement member 352 that may be orthogonal to a surface of the otoscope back-plate 316. The guide track may be connected to the otoscope back-plate 316 and may be connected a protruding connecting member, such as protruding connecting member 310 and/or protruding connecting member 311.

The otoscope engagement member 352 may have an undercut in one or more sides that may be orthogonal to the otoscope back-plate 316 such that an overhang may be created. The overhang may be parallel to the otoscope back-plate 316. The undercut may be the guide track 314 and/or the guide track 315. The overhang may be the protruding connecting member 310 and/or the protruding connecting member 311. The overhang may include one or more receiver elements that may be designed to engage with one or latching elements within the channel 306 and/or channel 307. A latching element of the one or more latching elements may be a resilient member, a protrusion, an outwardly extending lug, a key, and/or the like. A receiver element of the one or more receiver elements may be a recess, a cut out, a detent indentation, and/or the like.

The protruding connecting member 310 may include the receiver element 309, which may engage with the latching element 300. The protruding connecting member 310 may include the receiver element 312, which may engage the latching element 300 and/or the latching element 302. The protruding connecting member 310 may include the receiver element 318, which may engage with the latching element 302.

The protruding connecting member 311 may include the receiver element 305, which may engage with the latching element 301. The protruding connecting member 311 may include the receiver element 313, which may engage with the latching element 301 and/or the latching element 303. The protruding connecting member 311 may include the receiver element 317, which may engage with the latching element 303.

The otoscope assembly 120 may be slidably connected to clip assembly 122. The protruding connecting member 310 may slidable connect with channel 306. The protruding connecting member 311 may slidable connect with channel 307. The clip engagement member lip 360 may slidably connect with guide track 315. The clip engagement member lip 358 may slidably connect with guide track 314. The front surface of engagement member leg 356 and the front surface of engagement member leg 354 may slidably connect with the otoscope back-plate 316.

The clip assembly 122 may comprise the clip engagement member 118 and the end cap 304. The clip engagement member 118 may comprise a pair of legs extending from the ends of a connecting yolk portion that extends perpendicularly to the pair of legs. A leg (e.g., each leg) may comprise a recess at the distal end of the leg, such as the engagement member leg recess 342 and the engagement member leg recess 344, which may allow the end cap 304 to connect with and/or attach to the clip engagement member 118. A leg (e.g., each leg) may comprise a channel, such as the channel 306 and the channel 307, that cuts into a side of the leg that faces the opposing leg. The channel 307 may face the opposing log. The channel 307 may face the channel 306. The channel 307 may form a track that may engage with the protruding connecting member 311 from the otoscope assembly 120. The channel 307 may engage with the protruding connecting member 311 from otoscope assembly 120 such that clip assembly 122 may be movably connected, attached to, or engaged with clip engagement member 118 and/or clip assembly 122. For example, the channel 307 may allow the protruding connecting member 311 to slidably move within the channel 307 while engaging with the protruding connecting member 311 such that the clip assembly 122 may remain in contact with the otoscope assembly 120.

The channel 307 may include one or more latching elements. For example, the channel 307 may include the latching element 301 and/or the latching element 303. The latching element 301 and/or the latching element 303 may be a resilient member, a protrusion, an outwardly extending lug, a key, and/or the like.

The latching element 301 and/or the latching element 303 may be protrusions or outwardly extending lugs that may be received by a recess, such as a detent indentation or a radial recess, that may be provided by the protruding connecting member 311, such as the receiver dement 305, the receiver element 313, and/or the receiver element 317. A receiver element, such as the receiver element 305, the receiver element 313, and/or the receiver element 317, may be a recess, a cut out, a detent indentation, and/or the like.

In a first position, the latching element 301 may resiliently deform a surface of the protruding connecting member 311 and/or may engage with the receiver element 313, for example, in a snap fit. The latching element 303 may resiliently deform a surface of the protruding connecting member 311 and/or may engage with the receiver element 317, for example, in a snap fit.

In a second position, the latching element 301 may resiliently deform a surface of the protruding connecting member 311 and/or may engage with the receiver element 305, for example, in a snap fit. The latching element 303 may resiliently deform a surface of the protruding connecting member 311 and/or may engage with the receiver element 313, for example, in a snap fit.

The channel 306 may face the opposing leg. The channel 306 may face the channel 307. The channel 306 may form a track that may engage with the protruding connecting member 310 from the otoscope assembly 120. The channel 306 may engage with the protruding connecting member 310 from otoscope assembly 120 such that clip assembly 122 may be moveably connected, attached to, or engaged with the clip engagement member 118 and/or the clip assembly 122. For example, the channel 306 may allow the protruding connecting member 310 to slidably move within the channel 306 while engaging with the protruding connecting member 310 such that the clip assembly 122 may remain in contact with the otoscope assembly 120.

The channel 306 may include one or more latching elements. For example, the channel 306 may include the latching element 300 and/or the latching element 302. The latching element 300 and/or the latching element 302 may be a resilient member, a protrusion, an outwardly extending lug, a key, and/or the like.

The latching element 300 and/or the latching element 302 may be protrusions or outwardly extending lugs that may be received by a recess, such as a detent indentation or a radial recess, provided by protruding connecting member 310, such as the receiver element 309, the receiver element 312, and/or receiver element 318. A receiver element, such as the receiver element 309, the receiver element 312, and/or the receiver element 318, may be a recess, a cutout, a detent indentation, and/or the like.

In a first position, the latching element 300 may resiliently deform a surface of the protruding connecting member 310 and/or may engage with the receiver element 312, for example, in a snap fit. The latching element 302 may resiliently deform a surface of the protruding connecting member and/or may engage with the receiver element 318.

In a second position, the latching element 300 may resiliently deform a surface of the protruding connecting member 310 and/or may engage with the receiver element 309. The latching element 302 may resiliently deform a surface of the protruding connecting member 310 and/or may engage with receiver element 312, for example, in a snap fit.

The clip assembly 122 may comprise a contact surface 119. The contact surface 119 may be attached to a face of the clip engagement member 118, such as the face of the clip engagement member 118 that may be directed to a surface of the smart device that includes the camera. The contact surface 119 may be of an oval shape that may be complementary to the clip engagement member 118. The contact surface 119 may have an elongated aperture. The elongated aperture may march a complementary aperture in clip engagement member 118. The elongated aperture may allow a viewing portion of the otoscope assembly 120 to go through the contact surface 119. The contact surface 119 may be made of a resilient material that may absorb and/or apply pressure to a surface of the smart phone device. The contact surface 119 may be made of an anti slip material that may prevent the otoscope clip device 100 from moving when clamped to a smart phone device. The contact surface 119 may be made of a material that avoids damage, and/or scratches to the smart phone device. For example, the contact surface may be made of rubber, plastic, a polymer, and/or the like. The contact surface 119 may act as a light block to prevent light from leaking from the otoscope clip device, may prevent light from entering the otoscope clip device optics, and/or may act as a light block to prevent light from entering a camera of the smart device.

The clip assembly 122 may comprise the end cap 304. The end cap 304 may be a u-shaped member with a pair of legs, such as the end cap leg 332 and the end cap leg 334, extending from the ends of the curved center portion. The end cap 304 may be located at the proximal end of the clip engagement member 118. The end cap 304 may comprise a front surface 320 and back surface 322. When the otoscope clip device 100 is attached to a smart device, the front surface 320 many face the otoscope assembly 120 and the back surface 322 may face a surface of the smart device.

The end cap leg 332 may contact the u-shaped portion of end cap 304. The distal end of end cap leg 332 may be beveled at beveled portion 346. The end cap leg 332 may comprise the base end 324 that may be located at the proximal end of the end cap leg 332. The base end 324 may contact the u-shape portion of end cap 304. The base end 324 may be a smaller complementary shape to a cross-section of the u-shape portion of the end cap 304, such that a shoulder may be formed at one or more surfaces that may contact the proximal end of the base end 324. The shoulder may be orthogonal to the base end 324.

The end cap leg 332 may include the spine 328. The spine 328 may be raised from a surface of the end cap leg 332. The spine 328 may contact the base end 324 and may extend towards the distal end of end cap 304. Spine 328 may have a beveled distal end. The spine 328 may have a length that may terminate at the distal end of the end cap 304 and may have a width that may be less than the width of the end cap 304. The spine 328 may be resilient and may provide a bias toward the back surface 322 to allow the end cap foot 336 to engage the engagement member leg recess 344.

The end cap leg 332 may include the end cap foot 336. The end cap foot 336 may be a projecting foot positioned near the distal end of the end cap leg 332. The end cap foot 336 may be an outwardly projecting lug and may be resilient. The end cap foot 336 may connect with a hole, recess, or cut our near the distal end of a leg of the clip engagement member 118. For example, the end cap foot 336 may connect with the engagement member leg recess 344. The engagement member leg recess 344 may be a cut out in a wall or surface of the engagement member leg recess 344 that may be orthogonal to a surface of end cap leg 332 from which end cap foot 336 may protrude from.

The end cap leg 334 may contact the u-shaped portion of end cap 304. The distal end of end cap leg 334 may be beveled at beveled portion 348. The end cap leg 334 may comprise the base end 326 that may be located at the proximal end of the end cap leg 334. The base end 326 may contact the u-shape portion of the end cap 304. The base end 326 may be a smaller complementary shape to a cross-section of the u-shape portion of the end cap 304, such that a shoulder may be formed at one or more surfaces that may connect to the proximal end of base end 326. The shoulder may be orthogonal to base end 326. The end cap leg 334 may include the spine 330.

The spine 330 may be raised from a surface of the end cap leg 334. The spine 330 may contact the base end 326 and may extend towards the distal end of the end cap 304. The spine 330 may have a beveled distal end. The spine 330 may have a length that may terminate at the distal end of the end cap 304 and may have a width that may be less than the width of end cap 304. The spine 330 may be resilient and may provide a bias toward back surface 322 to allow end cap foot 338 to engage the engagement member leg recess 344.

The end cap leg 334 may include the end cap foot 338. The end cap foot 338 may be a projecting foot positioned near the distal end of the end cap leg 334. The end cap foot 338 may be an outwardly projecting lug and may be resilient. The end cap foot 338 may connect with a hole, recess, or cut out near the distal end of a leg of the clip engagement member 118. For example, the end cap foot 338 may connect with the engagement member leg recess 342. The engagement member leg recess 312 may be a cut out in a wall or surface of the clip engagement member 118 that may be orthogonal to a surface of the end cap leg 334 from which the end cap foot 338 may protrude from.

When connected to clip engagement member 118, the end cap 304 may prevent the otoscope assembly 120 from moving beyond a position and/or disengaging with the clip assembly 122. For example, the end cap 304 may prevent a user from accidentally moving the otoscope assembly 120 beyond a point to cause damage to the otoscope assembly 120

To assemble otoscope clip device 100, the otoscope assembly 120 may be slid into the clip assembly 122 and the end cap 304 may be connected to the clip engagement member 118 to retain otoscope assembly 120 within the clip assembly 122. The otoscope assembly 120 may slidably connect with clip assembly 122. For example, the protruding connecting member 310 may slide into the channel 306, the protruding connecting member may slide into the channel 307, the clip engagement member lip 360 may slide into the guide track 315, and the clip engagement member lip 358 may slide into the guide track 314.

Figure 4A:
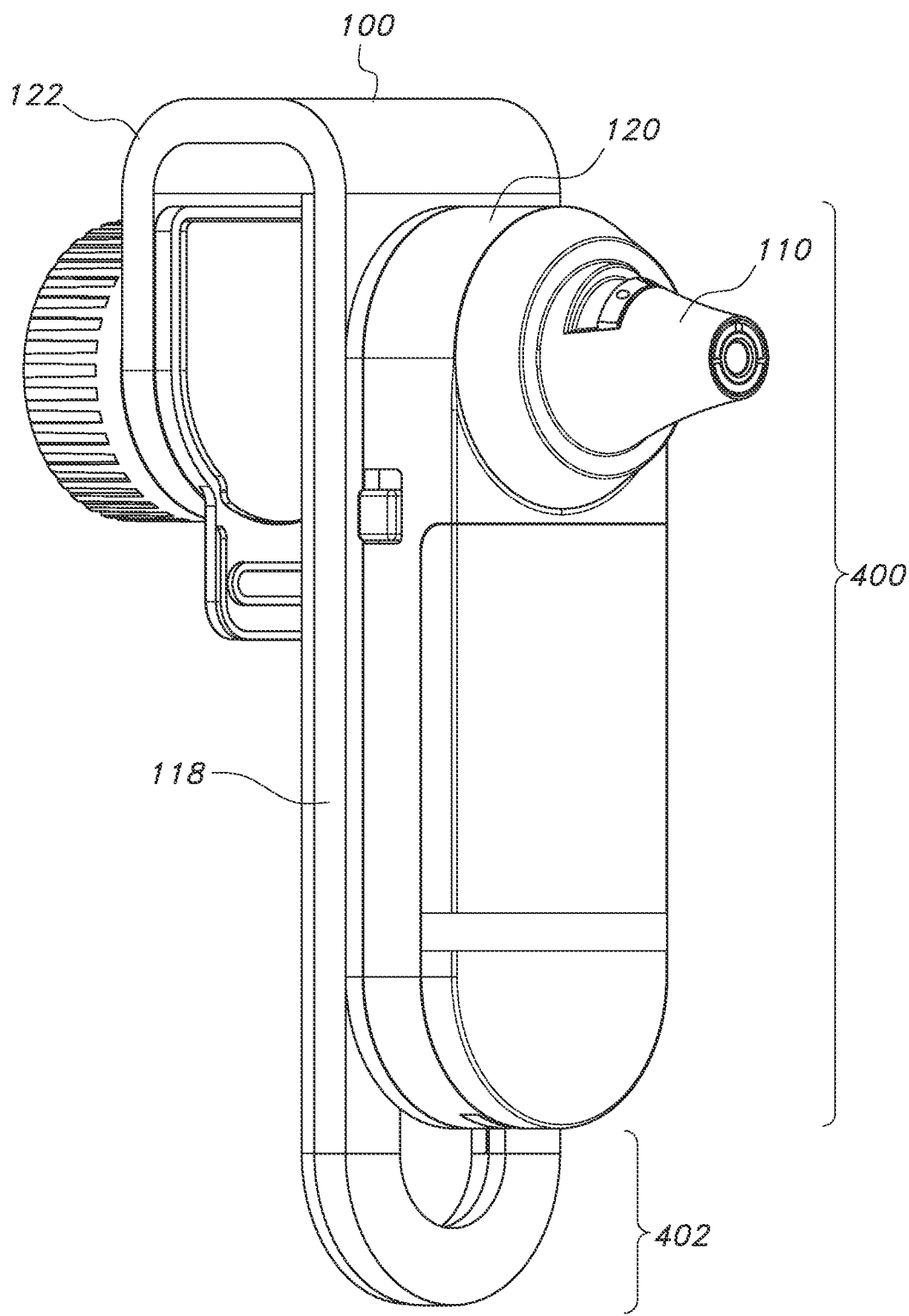
FIGS. 4A-C depict perspective views of an example otoscope clip device where the otoscope assembly is in a first position, which may be an upper position, within a clip assembly.
Figure 4B:
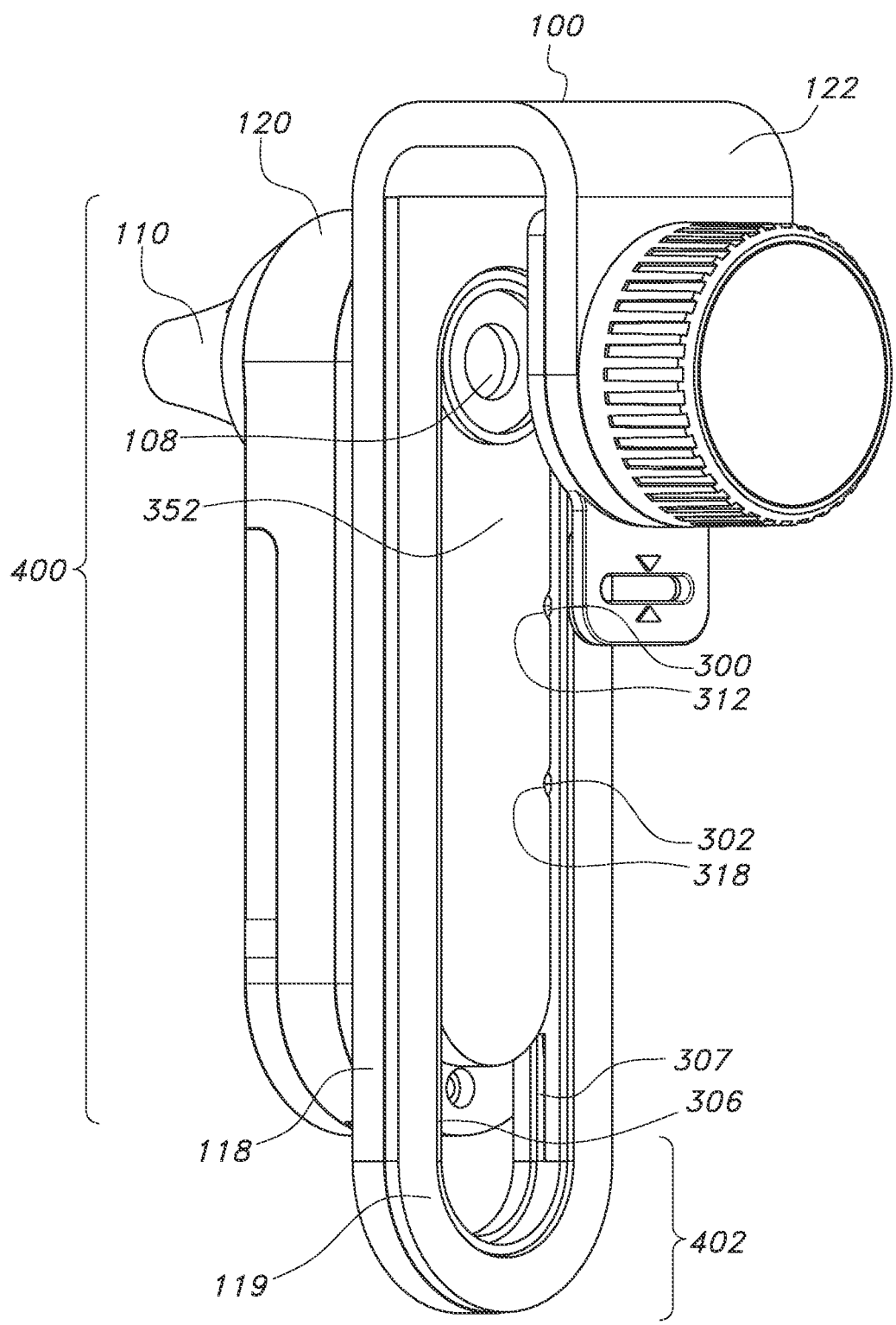
Figure 4C:
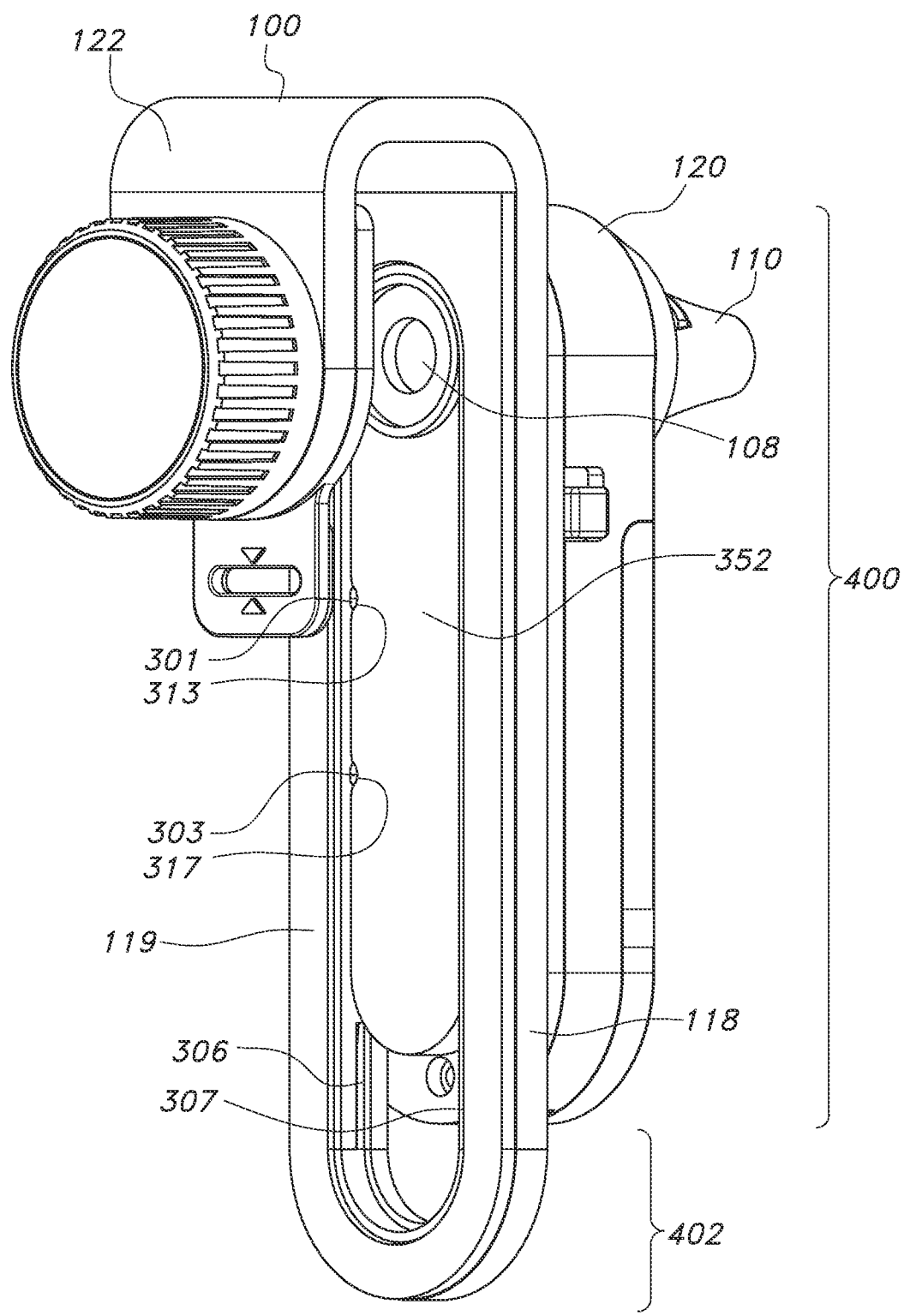

FIGS. 4A-C depict perspective views of an example otoscope clip device where the otoscope assembly is in a first position, which may be an upper position, within a clip assembly.

Different smart devices may include a camera in different positions and/or locations. For example, a first smart device may have the camera at a length from a distal end of the first smart device. A second smart device may have a camera at a length from a distal end of the second smart device that may be twice as long as the length for the first smart device.

To account for the differences in length, the otoscope clip device 100 may be adjustable. For example, the otoscope clip device 100 may allow the otoscope assembly 120 to be placed in one or more locations and/or positions within the clip assembly 122. As shown in FIGS. 4A-C, the otoscope clip device 100 may comprise the clip assembly 122 and the otoscope assembly 120. The otoscope assembly 120 may be slidably movable within the clip assembly 122. The otoscope assembly 120 may be slidably movable within the clip assembly 122 to assist in aligning the viewing portion 108 of the otoscope assembly with a smart device.

The otoscope assembly 120 may be in a first position, which may be the upper position 400, within the clip assembly 122. The upper position 400 may be an upper position within the clip assembly 122. For example, the upper position 400 may be a position where the otoscope assembly 120 may be near the proximal end of the clip engagement member 118. A user may place the otoscope assembly 120 in the upper position 400 by sliding otoscope assembly 120 toward the proximal end of the clip engagement member 118. When the otoscope assembly 120 is at the upper position 400, the otoscope engagement member 352 may create a gap in the lower portion such as the clip engagement member gap 402.

When the otoscope assembly 120 may be in the first position, the viewing portion 108, and/or the outer tip housing 110 may be aligned with the camera of the smart device. The otoscope assembly 120 may move or slide to the upper position 400 when the otoscope engagement member 352 slides toward the proximal end of the clip engagement member 118, for example, using the channel 306 and the channel 307. The otoscope assembly 120 may maintain the upper position 400 by being slidably connected to the clip engagement member 118. The otoscope Assembly 120 may be slidably connected to the clip engagement member 118 at the upper position 400 via the latching element 300 being engaged to the receiver element 312, the latching element 302 being engaged to the receiver element 318, the latching element 301 being engaged to the receiver element 313, and/or the latching element 303 being engaged to the receiver element 317.

When in the upper position 400, the otoscope assembly 120 may not use one or more latching elements. The otoscope engagement member 352 may not use one or more latching elements provided by the channel 306 and/or the channel 307 For example, the receiver element 305 and/or the receiver element 309 may not be engaged with a latching element.

Figure 5A:
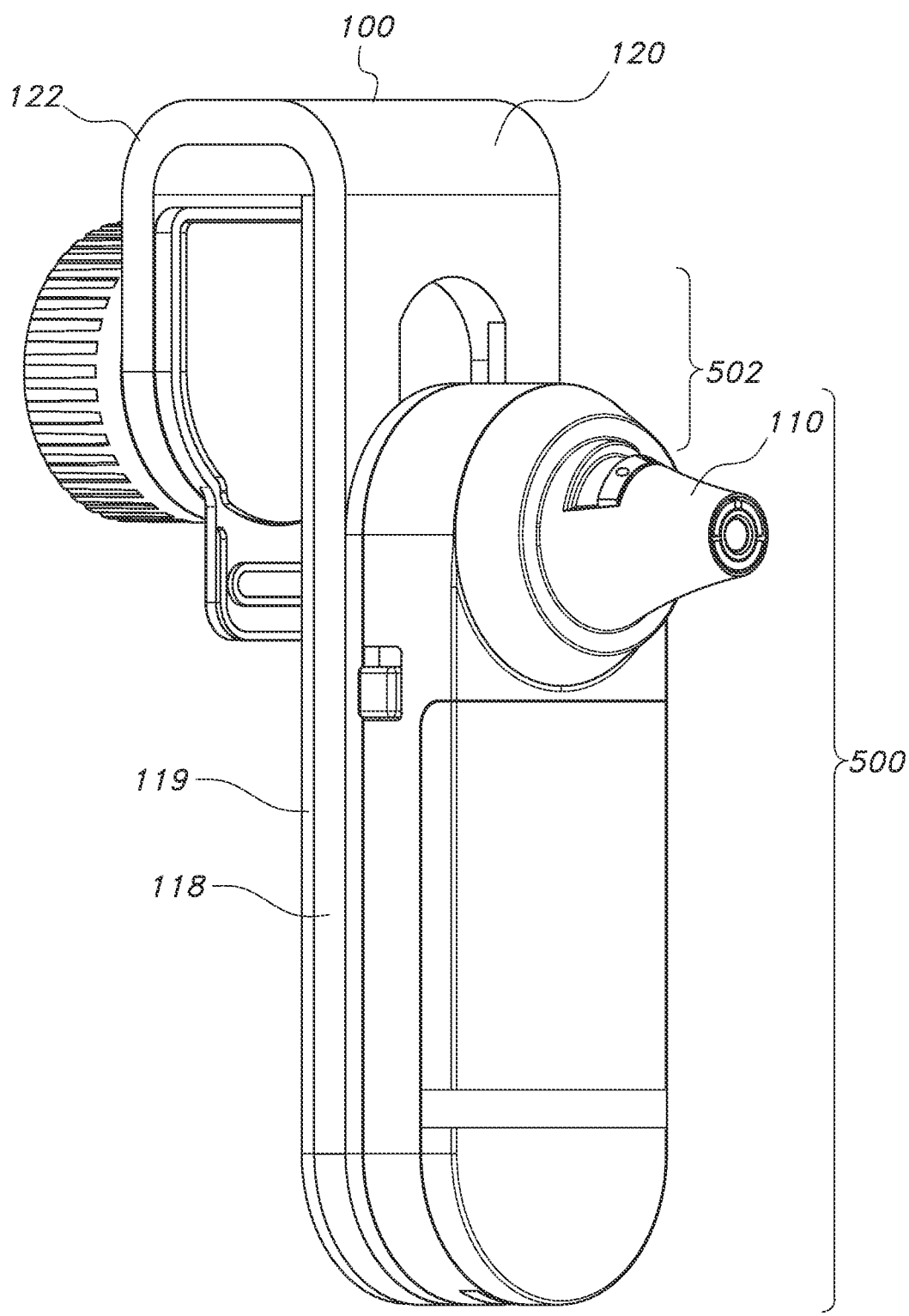
FIGS. 5A-C depict perspective views of an example otoscope clip device where the otoscope assembly is in a second position, which may be a lower position, within a clip assembly.
Figure 5B:
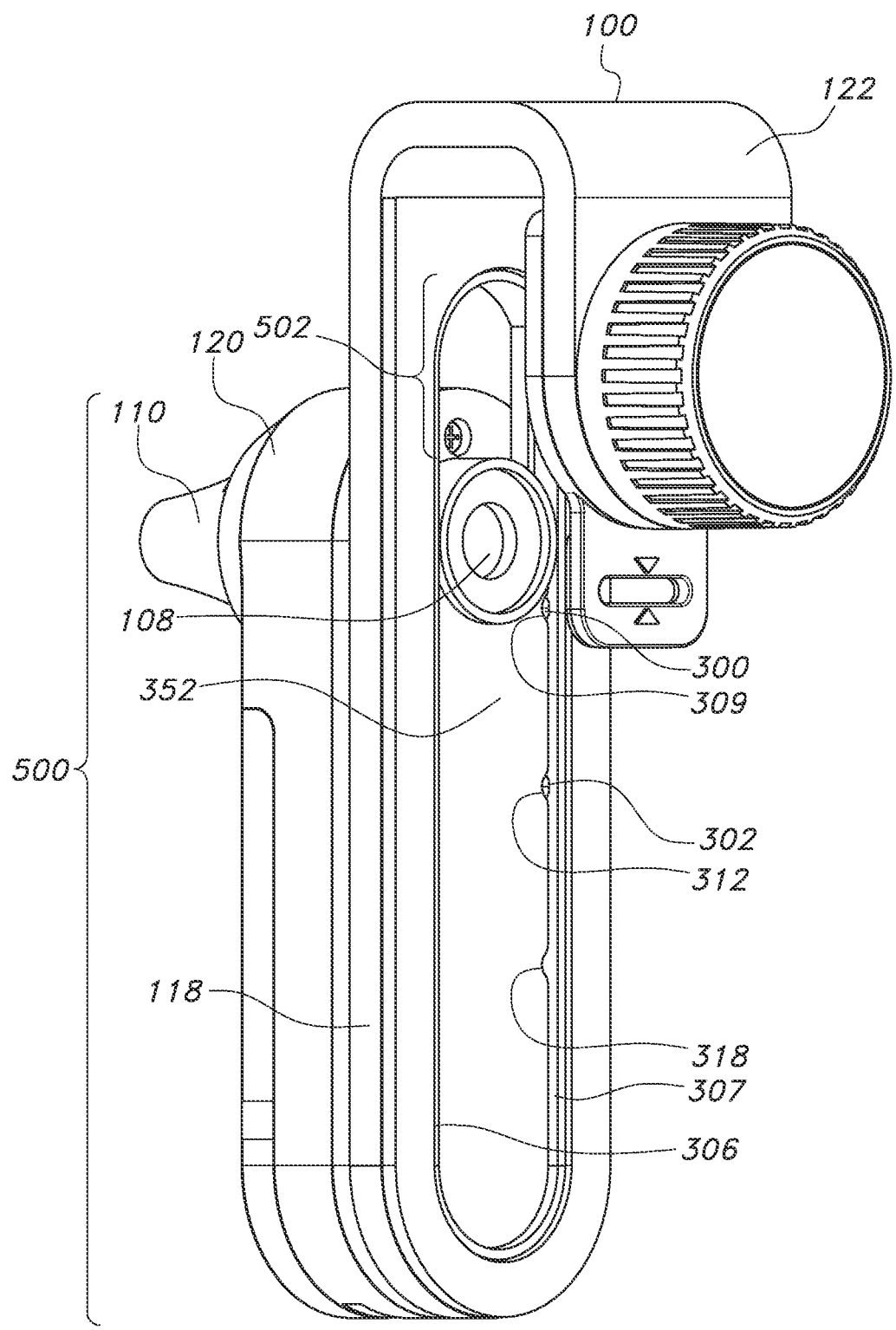
Figure 5C:
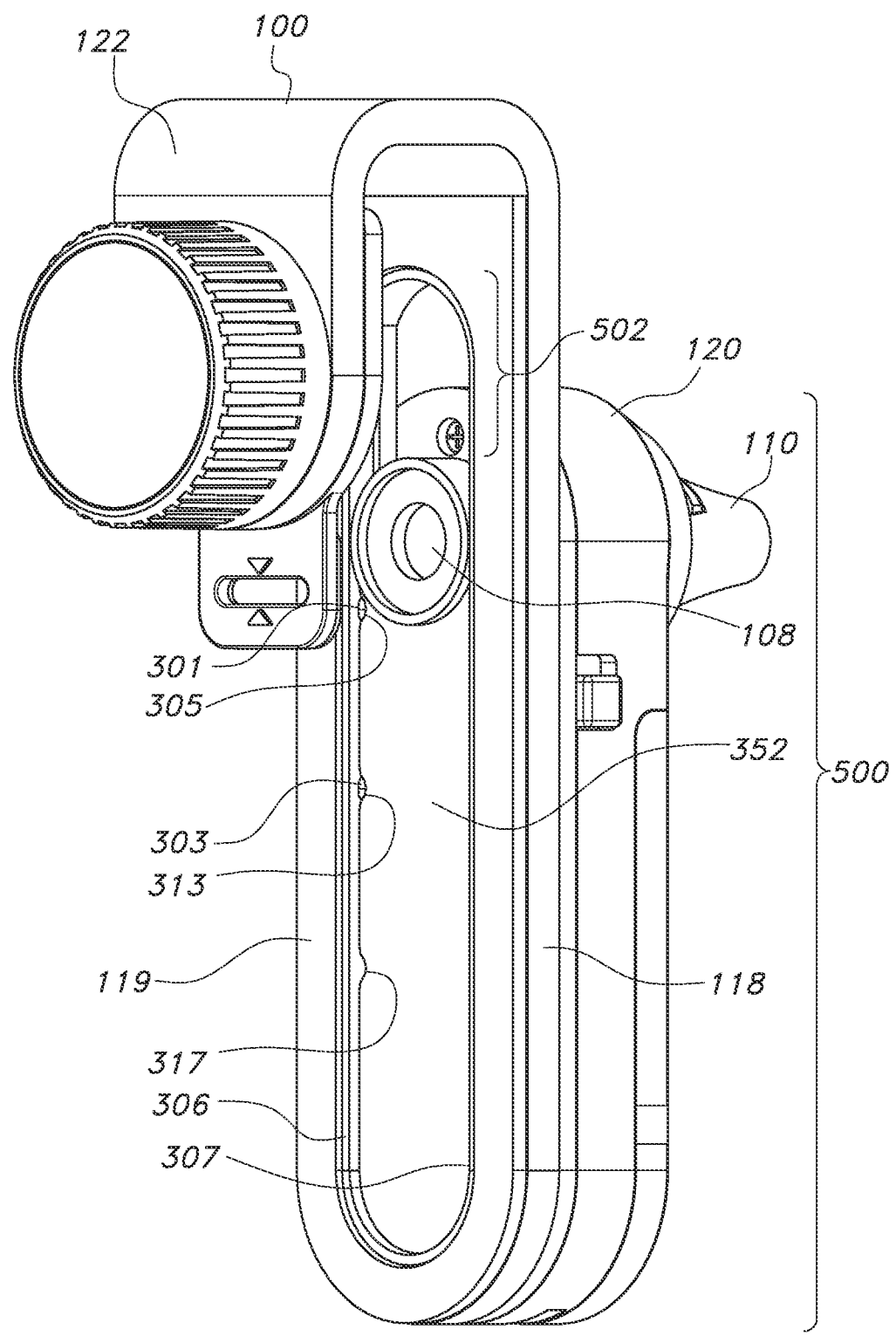

FIGS. 5A-C depict perspective views of an example otoscope clip device where the otoscope assembly is in a second position, which may be a lower position, within a clip assembly. To account for the differences in length, the otoscope clip device 100 may be adjustable. For example, the otoscope clip device 100 may allow the otoscope assembly 120 to be placed in one or more locations and/or positions within the clip assembly 122. As shown in FIGS. 5A-C, the otoscope clip device 100 may comprise the clip assembly 122 and the otoscope assembly 120. The otoscope assembly 120 may be slidably movable within clip assembly 122. The otoscope assembly 120 may be slidably movable within clip assembly 122 to assist in aligning the viewing portion 108 of the otoscope assembly with a smart device.

The otoscope assembly 120 may be in a second position, which may be the lower position 500, within the clip assembly 122. The lower position 500 may be a lower position within the clip assembly 122. For example, the lower position 500 may be a position where the otoscope assembly 120 may be near the proximal end of the clip engagement member 118. A user may place the otoscope assembly 120 in the lower position 500 by sliding otoscope assembly 120 toward the proximal end of the clip engagement member 118. When the otoscope assembly 120 is at the lower position 500, the otoscope engagement member 352 may create a gap in the upper portion such as the clip engagement member gap 502.

When the otoscope assembly 120 may be in the second position, the viewing portion 108 and/or the outer rip housing 110 may be aligned with the camera of the smart device. The otoscope assembly 120 may move or slide to the lower position 500 when otoscope engagement member 352 slides toward the distal end of the clip engagement member 118, for example, using the channel 306 and the channel 307.

The otoscope assembly 120 may maintain the lower position 500 by being slidably connected to the clip engagement member 118. The otoscope assembly 120 may be slidably connected to the clip engagement member 118 at the position 500 via the latching element 302 being engaged to the receiver element 312, the latching element 300 being engaged to the receiver element 309, the latching element 303 being engaged to the receiver element 313, and the latching element 301 being engaged to the receiver element 305.

When in the lower position 500, the otoscope assembly 120 may not use one or more available latching elements. The otoscope engagement member 352 may not use one or more latching elements provided by the channel 306 and/or the channel 307. For example, the receiver element 317 and/or the receiver element 318 may not be engaged with a latching element.

Figure 6:
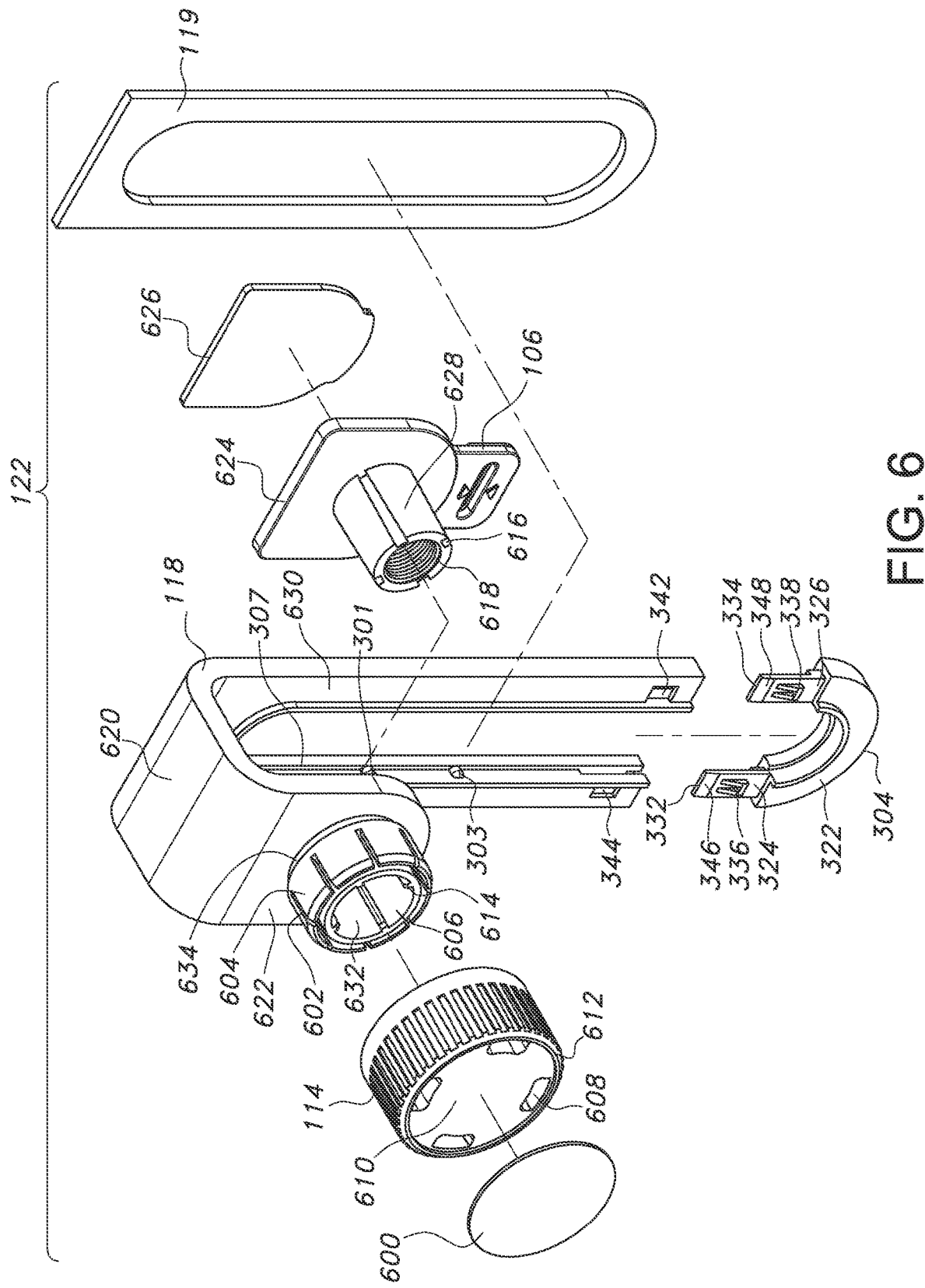
FIG. 6 depicts a schematic view a clip assembly that may compose one or more components.

FIG. 6 depicts a schematic view of a clip assembly that may comprise one or more components. As shown in FIG. 6, the clip assembly 122 may comprise the clip engagement member 118, the connecting member 620, and the screw clamp assembly 622.

The clip engagement member 118 may comprise one or more channels that may allow for engagement and/or attachment with an otoscope engagement member. For example, the clip engagement member 118 may comprise the channel 307. The channel 307 may comprise the latching element 301 and the latching element 303. The latching element 301 and the latching element 303 may be a resilient lug or protrusion that may resiliently contact a recess that may belong to the otoscope engagement member. The clip engagement member 118 may include the engagement member leg recess 342 and the engagement member leg recess 344.

The clip engagement member 118 may comprise rite end cap 304. The end cap 304 may comprise a front surface and a back surface, such as the back surface 322. The end cap 304 may comprise the end cap leg 332 and the end cap leg 334. The end cap leg 332 may comprise the beveled portion 346 that may be at the distal end of the end cap leg 332, the end cap foot 336, and the base end 324 that may be at the proximal end of the end cap leg 332. The end cap leg 334 may comprise the beveled portion 348 that may be at the distal end of the end cap leg 334, the end cap foot 338, and the base end 326 that may be at the proximal end of the end cap leg 334. The end cap 304 may be connected to the clip engagement member 118 via the end cap foot 336 engaging with engagement member leg recess 344 and end cap foot 338 engaging with the engagement member leg recess 342.

The clip engagement member 118 may comprise the inner surface 630. The inner surface 630 may be in contact with contact surface 119. The contact surface 119 may have an aperture that may be elongated to match the aperture formed within the clip engagement member 118. The contact surface 119 may be made of material that may prevent slipping, for example, when the clip assembly 122 may be attached to a smart device. The contact surface 119 may be made of a material that may prevent and/or avoid damage to a surface of a smart device. For example, the material of contact surface 119 may be in contact with the surface of a smart phone device and may prevent scratching, chipping, or other damage to surface of the smart phone device.

The connecting member 620 may be connected to the clip engagement member 118 and may be connected to the screw clamp assembly 622. The connecting member 620 may be connected to the clip engagement member 118 such that the connecting member 620 may be orthogonal to clip engagement member 118. The surfaces at which connecting member 620 may make contact the clip engagement member 118 may be rounded or may have a fillet.

The connecting member 620 may be connected to the screw clamp assembly 622 such that the connecting member 620 may be orthogonal to the screw clamp assembly 622. The surface at which connecting member 620 may contact the screw clamp assembly 622 may be rounded or may have a fillet.

The screw clamp assembly 622 may the comprise piston 624, the outer ring 604, the inner ring 606, the key 614, the aperture 632, and the knob 114. The knob 114 may be cylindrical and may have a textured outer ring which may be splines, knurling, and/or the like. The knob 114 may have a bottom side that faces the screw clamp assembly 622. The bottom side of knob 114 may have a hole that may have an outer ring, a locking ring, and a threaded protrusion in its center. The outer ring of the bottom side of the knob may have a circumference that may be larger than the outer ring 604. The locking ring may be formed at the end of the knob that is faces towards the outer ring 604. The locking ring may be of a smaller circumference than the outer ring 604. The locking ring may be of a larger circumference than locking groove 634. The locking ring may be resilient such that it may resiliently contact the locking groove 634 such that knob 114 may be movable attached to the screw clamp assembly 622.

The knob 114 may have a topside that may have one or more irregular apertures such as the aperture 608. The top side of knob 114 may comprise circular surface 610 which may be countersunk such that a lip may be formed, such as the circular lip 612. The knob cap 600 may be in contact with circular surface 610. For example, the knob cap 600 may be press fir into the circular surface 610 such that the knob cap 600 be near or flush with the circular lip 612.

The screw clamp assembly 622 may comprise the aperture 632. The aperture 632 may allow a threaded protrusion from knob 114 to contact the piston 624, flic aperture 632 may be surrounded by the inner ring 606. For example, the inner ring 606 may contact a circumference of the aperture 632.

The inner ring 606 may contact a surface of the screw clamp assembly 622 drat may be parallel to the clip engagement member 118. The inner ring 606 may be a hollow cylinder with the inner surface, and an outer surface, and an aperture complementary positioned to the aperture 632. The inner ring 606 may protrude a length orthogonally from a surface of the screw clamp assembly 622. The inner ring 606 may comprise one or more keys that may be located on the inner surface of the inner ring 606. For example, the inner ring 606 may comprise key 614 which may be a complementary shape to keyway 616 on shaft 628 of piston 624.

The outer ring 604 may be of a larger circumference than the inner ring 606. The outer ring 604 may be in contact with a surface of the screw clamp assembly 622. The outer ring may protrude a length orthogonally from a surface of the screw clamp assembly 622. The distal end of the outer ring 604 may be chamfered. The outer ring 604 may have one or more notches or kerfs, such as the kerf 602. The kerf 602 may begin at the distal end of the outer ring 604 and may end a length before the proximal end of the outer ring 604. The proximal end of outer ring 604 may be in contact with the locking groove 634.

The locking groove 634 may have a circumference that may be smaller than outer ring 604. The locking groove 634 may be larger than the circumference of inner ring 606. The locking groove 634 may be in contact with the outer ring 604 and a surface of screw clamp assembly 622 that may be parallel to the clip engagement member 118. The locking groove 634 may protrude a length orthogonally from a surface of the screw clamp assembly 622.

The screw clamp assembly 622 may comprise the piston 624. The piston 624 may comprise of a rectangular upper portion with rounded or filleted edge and may comprise a u-shaped bottom portion. The u-shape of the of u-shaped bottom portion may be in contact with the alignment tab 106. The piston may comprise a front surface and a parallel back surface. The back surface may be in contact with the contact surface 626. When the piston is placed in the screw clamp assembly 622, the front surface and the back surface of the piston may be parallel to a surface of the screw clamp assembly 622 and the clip engagement member 118. The front surface may be connected to the shaft 628.

The shaft 628 may protrude orthogonally from the faint surface of the piston 624. The distal end of the shaft 628 may have a threaded hole, such as threaded hole 618. The shaft 628 may have one or more keyways, such as keyway 616. The keyway 616 may have a complementary shape to the key 614. The keyway 616 may be a channel that runs from the distal end of the shaft 628 to the proximal end of the shaft 628 and may terminate at the front surface of the piston 624.

When assembled, the screw clamp assembly 622 may engage the piston 624 such that the contact surface 626 and the contact surface 119 may become pads of a clamp. The screw clamp assembly 622 may cause the piston 624 to move towards the clip engagement member 118, such that the contact surface 626 may contact one surface of a smart device and the contact surface 119 may contact another surface of the smart device.

The contact surface 626 and/or the contact surface 119 made up a material that prevents damage, such as scratching, to a surface of the smart device. The contact surface 626 and/or the contact surface 119 may be made of rubber, fabric, plastic, and/or any other material that may prevents damage to the smart phone. The contact surface 626 and/or the contact surface 119 may be made of a material that prevents the clamp from slipping from the surface of the smart phone. For example, the contact surface 626 and/or the contact surface 119 may be made of rubber which may provide friction to avoid the clamp from slipping and/or moving from a position on a surface of the smart device.

The screw clamp assembly 622 may be assembled. The end cap 304 may be in contact with the clip engagement member 118. The contact surface 119 may be placed on the inner surface 630 of clip engagement member 118. The inner surface 630 may face a surface of the smart device that includes a camera. The inner surface 630 may be parallel to the inner surface of the screw clamp assembly.

The contact surface 626 may be in contact with the piston 624. The shaft 628 of the piston 624 may be placed within the aperture formed by inner ring 606 such that keyway 616 may contact the key 614. For example, the shaft 628 of the piston 624 may be placed within aperture 632. When the shaft 628 is placed through the aperture 632, the piston 624 may be positioned such that contact surface 626 may be parallel to the contact surface 119 and the alignment tab 106 may extend beyond an edge of the screw clamp assembly 622.

The knob cap 600 may be placed in contact with the circular surface 610, which may be associated with knob 114. For example, the knob cap 600 may be press fit into circular surface 610 such that the knob cap 600 may be in contact with (e.g., flush) with circular lip 612. The knob 114 may be in contact with the outer ring 604. For example, the knob 114 may be pressed on to the outer ring 604 and may contact the interior of the knob 114 such that knob 114 may be moveably connected to the outer ring 604. For example, when movably connected to the outer ring 604, the knob 114 may be twisted by a user.

The knob 114 may include a threaded protrusion that may be connected to the shaft 628 of the piston 624. The threaded protrusion on the knob 114 may be inserted and/or threaded to the threaded hole 618 within the shaft 628. The threaded protrusion may allow knob 114 to secure the piston 624 in a position that may be parallel to the clip engagement member 118.

The knob 114 may be twisted and may cause the clamp formed by the screw clamp assembly 622 to clamp a smart device. For example, twisting the knob 114 may cause the threaded protrusion of the knob 114 to thread or unthread the threaded hole 618. The rotational force of the threading or unthreading the threaded hole 618 may be redirected by one or more keys onto one or more key ways such that the piston 624 may be prevented front rotating and may be forced to move linearly in a direction toward or away from the clip engagement member 118. For example, the rotational force generated by the threading or unthreading the threaded hole 618 may be transferred as a linear force to the piston 624 via the threaded hole 618, the key 614, and/or the keyway 616. Twisting the knob 114 may move the piston 624 toward clip engagement member 118, such that the contact surface 626 may move towards a parallel surface of the clip engagement member 118, such as the contact surface 119. Twisting the knob 114 may cause the contact surface 626 and/or the contact surface 119 to contact a surface of a smart phone device. For example, twisting the knob 114 may cause the contact surface 119 to contact a back side of a smart device that may include a camera, and twisting the knob 114 may cause the contact surface 626 to contact a front side of a smart device that may include a display. The knob 114 may comprise a thread, such as a reverse thread.

When turned, the knob 114 may engage the screw clamp assembly 622 such that the piston 624 that may include alignment tab 106 may be moved towards a surface that may be parallel to alignment tab 106, such as the contact surface 119 that may be in contact with a surface of the clip engagement member 118. For example, a user may turn the knob 114 in a clockwise direction so that the alignment tab 106 may move towards a parallel surface of the clip assembly 122. The knob 114 may cause the alignment tab 106 to move towards the clip engagement member 118 such that alignment tab 106 and the clip engagement member 118 may clamp onto the smart device. A user may turn the knob 114 in a counterclockwise direction so that the alignment tab 106 may move away from a parallel surface of the clip assembly 112.

Figure 7:
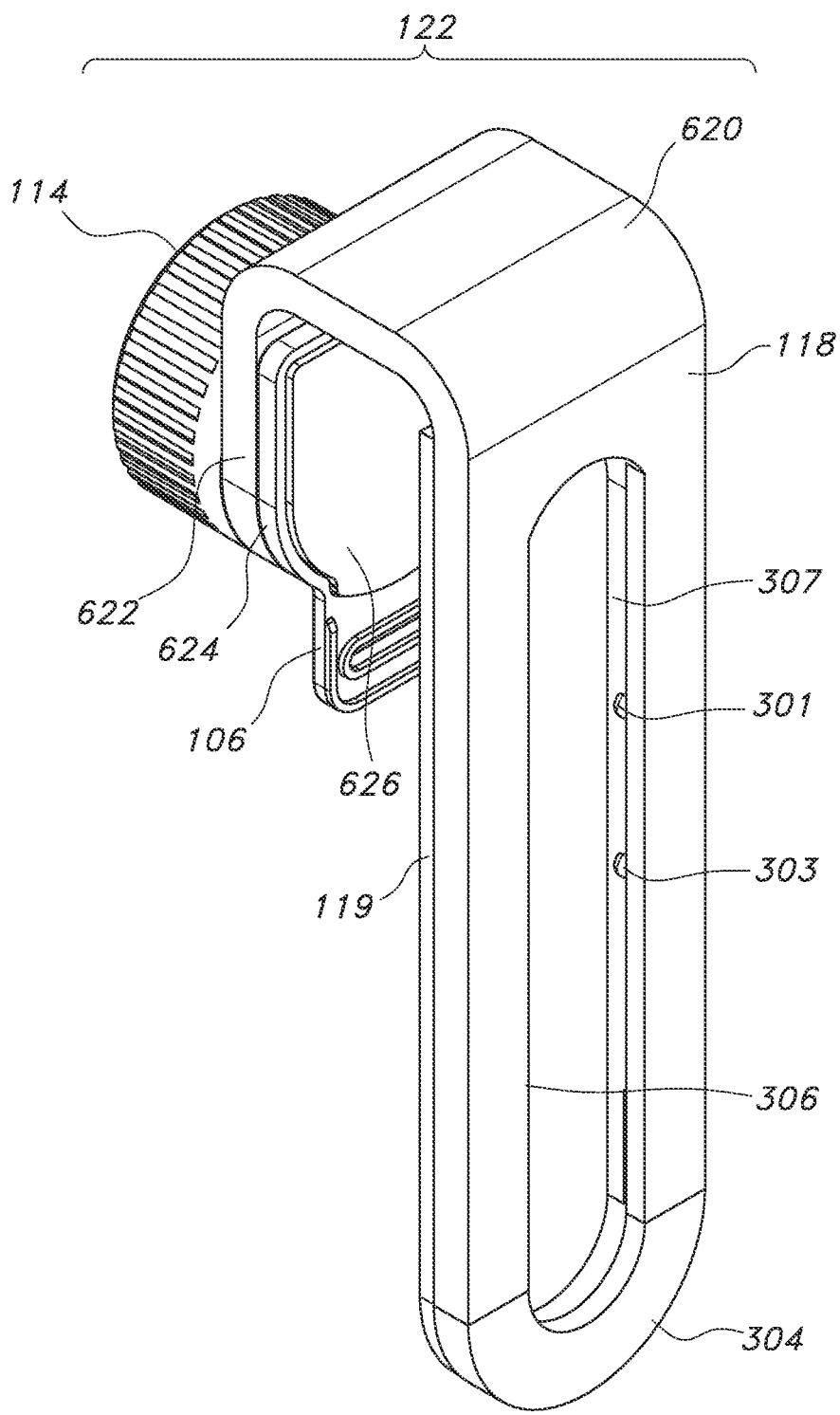
FIG. 7 depicts a perspective view of a clip assembly that may comprise a screw clamp assembly.

FIG. 7 depicts a perspective view of a clip assembly that may comprise a screw clamp assembly. As shown in FIG. 7, the clip assembly 122 may be assembled and may comprise a number of components. The clip assembly 122 may comprise the knob 114. The knob 114 may be connected to the piston 624 via an aperture through the screw clamp assembly 622, such as aperture 632 (shown in FIG. 6). The piston 624 may be in contact with the contact surface 626. The piston 624 may comprise the alignment tab 106. The screw clamp assembly 622 may be in contact with the connecting member 620. The connecting member 620 may be in contact with the clip engagement member 118. The clip engagement member 118 may comprise an elongated aperture and may have one or more internal sidewalls along the elongated aperture. The one or more internal sidewalls of the clip engagement member 118 may comprise a channel. For example, the clip engagement member 118 may comprise the channel 306 and the channel 307. The channel 307 may comprise the latching element 301 and the latching element 303. The channel 306 may comprise the latching element 300 and the latching element 302. The clip engagement member 118 may compose the end cap 304.

Figure 8:
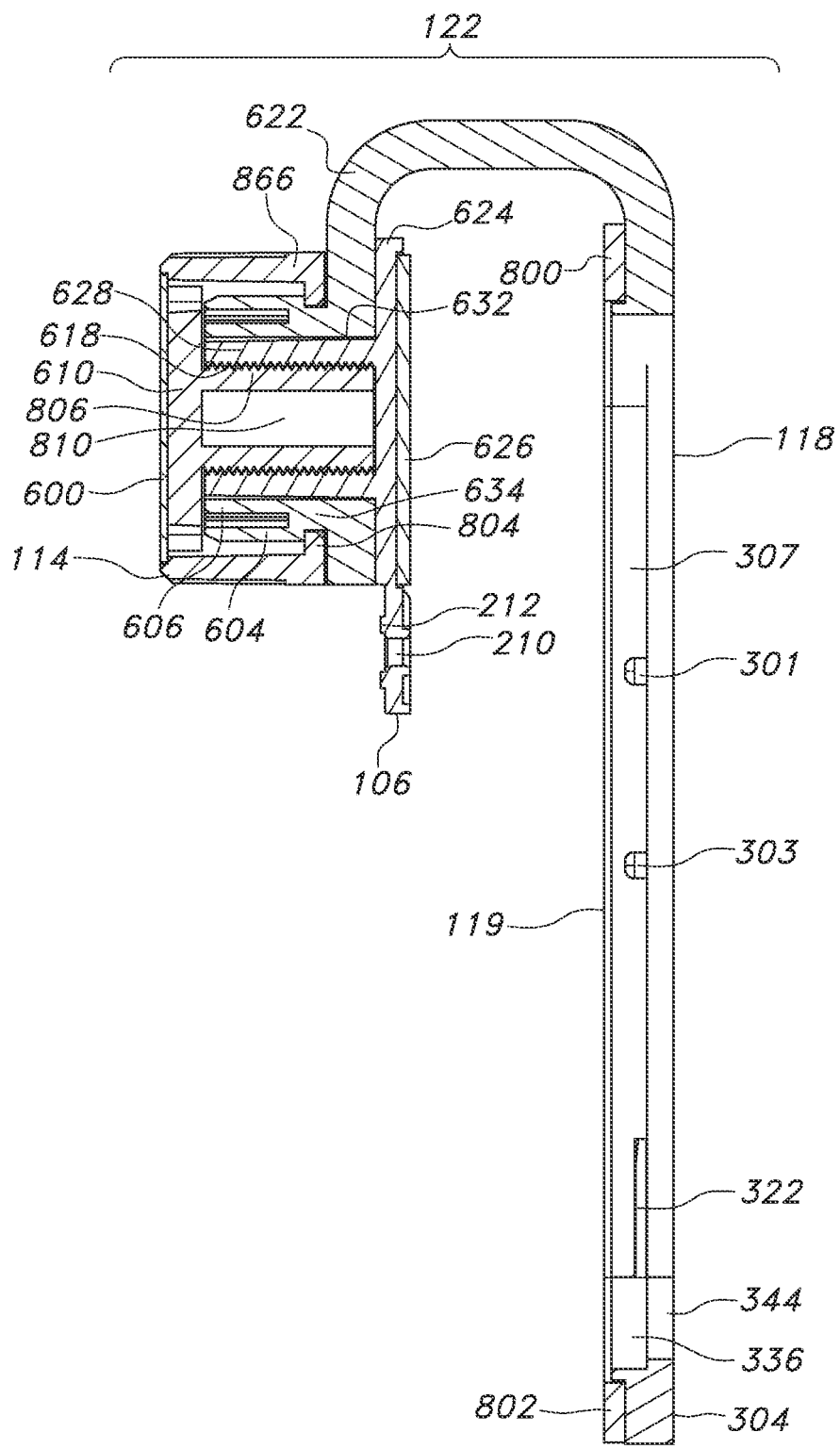
FIG. 8 depicts a cross section view of a clip assembly that may compose a screw clamp assembly.

FIG. 8 depicts a cross section view of a clip assembly that may comprise a screw clamp assembly. The clip assembly 122 may comprise the clip engagement member 118. The clip engagement member 118 may comprise the channel 307 that may run a length of the clip engagement member 118. The channel 307 may comprise the latching element 301 and the latching element 303. The latching element 301 and/or the latching element 303 may engage a receiver element that may belong to an otoscope engagement member.

The clip engagement member 118 may comprise the engagement member leg recess 344. The engagement member leg recess 344 may be engaged with the end cap foot 366. The end cap foot 366 may lie resilient and may be resiliently connected to the engagement member leg recess 344, such that end cap 304 may be removably attached to clip engagement member 118.

The clip engagement member 118 may be connected to the contact surface 119. The contact surface 119 may be of varying thickness. For example, the contact surface 119 may be of one thickness at its center and may be at a different thickness at its ends. For example, the conflict surface 119 may have a different thickness at the end of contact surface 800 and/or the end of contact surface 802 than at a different location within the contact surface 119.

The screw clamp assembly 622 may comprise the aperture 632. The aperture 632 located at a surface of the screw clamp assembly 622 that may be parallel to the clip engagement member 118. The shaft 628 of the piston 624 may pass through the aperture 632. The shaft 628 may be connected to the piston 624. The shaft of 628 may protrude orthogonally from a surface of the piston 624. The shaft of 628 may move freely through the aperture 632. The shaft of 628 may have an exterior and an interior. The interior of the shaft of 628 may comprise the threaded hole 618. For example, the distal end of the shaft 628 may have a threaded hole.

The threaded hole 618 may be engaged by the knob 114 via the threaded protrusion 806. For example, the Threaded protrusion 806 may contact the threaded hole 618 by threading the threaded hole 618. The threaded protrusion 806 may have a hollow interior. For example, the threaded protrusion 806 may have an outer wall with a thread and may have an inner wall that may form a cylindrical hole that extends towards the piston 624, such as the hole 810. The threaded protrusion 806 may have a reverse thread. The threaded protrusion 806 may protrude from the circular surface 610. For example, the threaded protrusion 806 may protrude orthogonally from the circular surface 610. The threaded protrusion 806 may be connected to the circular surface 610.

The circular surface 610 may be countersunk such that a circular lip may be formed. The knob cap 600 may be in contact with circular surface 610. For example, the knob cap 600 may be press fit into circular surface 610 such that knob cap 600 be near or flush with the circular lip.

The aperture 632 may be surrounded by the inner ring 606. For example, the inner ring 606 may contact a circumference of the aperture 632.

The inner ring 606 may contact a surface of the screw clamp assembly 622 that may be parallel to the clip engagement member 118. The inner ring 606 may be a hollow cylinder with the inner surface, and an outer surface, and an aperture complementary positioned to the aperture 632. The inner ring 606 may protrude a length orthogonally from a surface of the screw clamp assembly 622. The inner ring 606 may comprise one or more keys that may be located on the inner surface of the inner ring 606.

The outer ring 604 may be of a larger circumference than the inner ring 606. The outer ring 604 may be in contact with a surface of the screw clamp assembly 622. The outer ring may protrude a length orthogonally from a surface of the screw clamp assembly 622. The distal end of outer ring 604 may be chamfered. The outer ring 604 may have one or more notches or kerfs. The proximal end of outer ring 604 may be in contact with the locking groove 634.

The locking groove 634 may have a circumference that may be smaller than the outer ring 604. The locking groove 643 may be larger than the circumference of the inner ring 606. The locking groove 634 may be in contact with the outer ring 604 and a surface of the screw clamp assembly 622 that may be parallel to the clip engagement member 118. The locking groove 634 may protrude a length orthogonally from a surface of the screw clamp assembly 622.

The knob 114 may comprise the circular surface 610, the threaded protrusion 806, the hole 810, the knob cap 600, and the locking ring 804. The knob 114 may be cylindrical and may have a textured outer surface, such as the knob outer surface 807, which may be splines, knurling, and/or the like. The knob 114 comprise the knob outer surface 807, the locking ring 804, and the threaded protrusion 806. The locking ring 804 may have a circumference that may be larger than the outer ring 604. The locking ring 804 may be formed at the end of the knob that is nearest to outer ring 604. The locking ring may be of a smaller circumference than the outer ring 604. The locking ring may be of a larger circumference than locking groove 631. The locking ring may be resilient such that it may resiliently contact the locking groove 634 such that knob 114 may be removably attached to the screw clamp assembly 622.

The piston 624 may comprise the alignment tab 106. The alignment tab 106 may comprise the vertical alignment rah feature 210 and the horizontal alignment tab feature 212. The vertical alignment tab feature 210 may be aperture, such as an oval aperture. The horizontal alignment tab feature 212 may be a protrusion, such as a triangle or arrow shaped protrusion. The horizontal alignment fab feature 212 may protrude orthogonally from a surface of the piston 624.

The knob 114 may be twisted and may cause the clamp formed by the screw clamp assembly 622 to clamp a smart device. For example, twisting rite knob 114 may cause the threaded protrusion 806 to thread or unthread the threaded hole 618. The rotational force of the threading or unthreading the threaded hole 618 may be redirected by one or more keys onto one or more keyways such that piston 624 may be prevented from rotating and may be forced to move linearly in a direction toward or away from the clip engagement member 118. For example, the rotational force generated by the threading or unthreading the threaded hole 618 may be transferred as a linear force to piston 624 via threaded hole 618, a key, and/or a keyway. Twisting the knob 114 may move piston 624 toward the clip engagement member 118 such that the contact surface 626 may move towards the contact surface 119. Twisting the knob 114 may cause the contact surface 626 and/or the contact surface 119 to contact a surface of a smart phone device. For example, twisting the knob 114 may cause the contact surface 119 to contact a back side of a smart device that may include a camera, and twisting the knob 114 may cause the contact surface 626 to contact a front side of a smart device that may include a display.

Figure 9A:
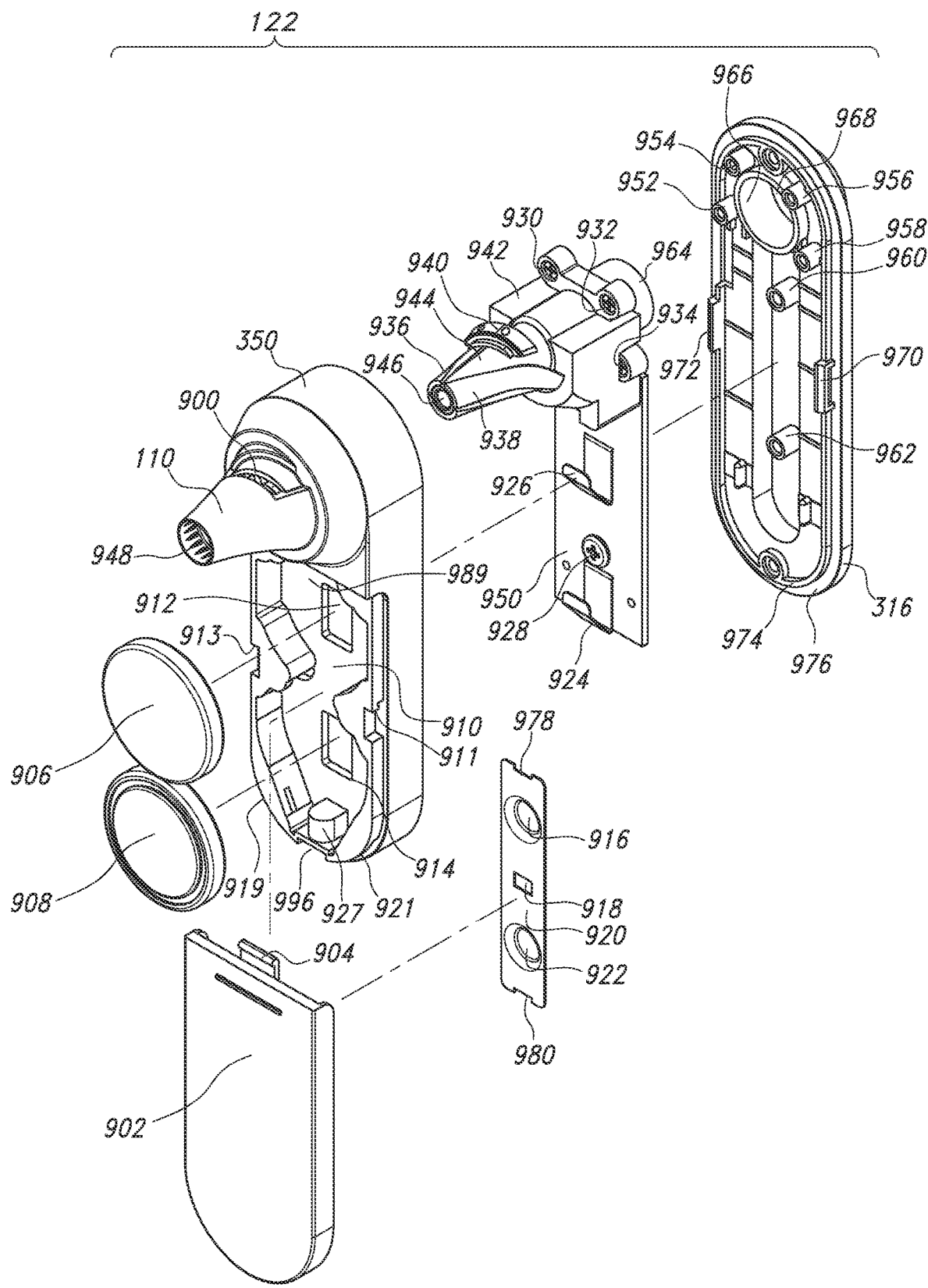
FIGS. 9A-B depict schematic views of an otoscope assembly that comprises one or more components.
Figure 9B:
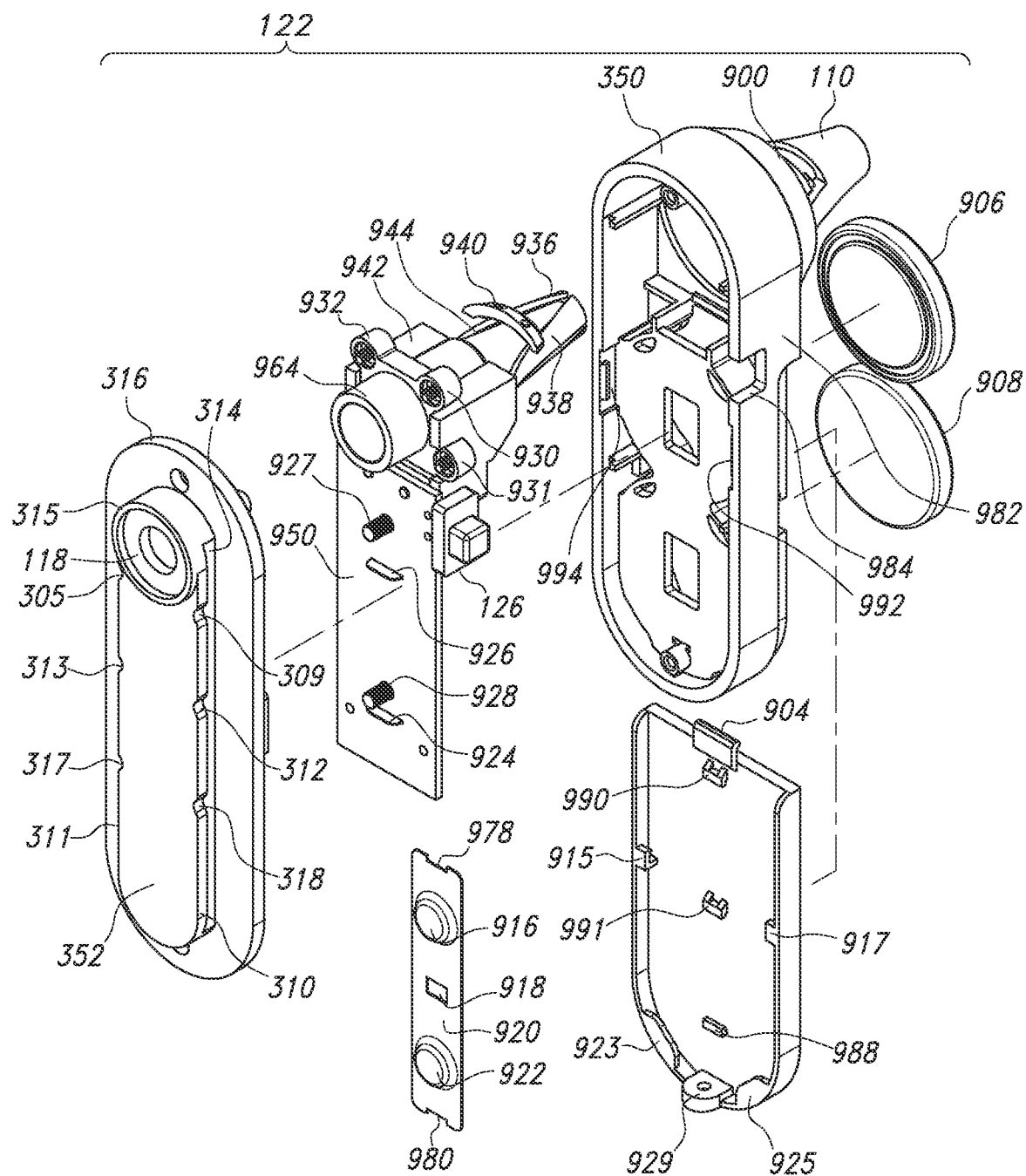

FIGS. 9A-B depict schematic views of an otoscope assembly that comprises one or more components. The otoscope assembly 120 may comprise the battery cover 902, the main body 350, the inner otoscope housing 942, and the otoscope back-plate 316.

The battery cover 902 may comprise the retention protrusion 915, the retention protrusion 917, the retention protrusion 923, and the retention protrusion 925. The retention protrusion 915 and/or the retention protrusion 917 may connect to the battery cover and may connect to an inner sidewall that is orthogonal to the underside of the battery cover. The retention protrusion 915 and/or the retention protrusion 917 may protrude from the inner sidewall of the battery cover 902. The retention protrusion 915 and/or the retention protrusion 917 may be an L-shape, with at least a leg parallel with the inner side wall of the battery cover 902 The retention protrusion 923 and/or the retention protrusion 925 may protrude from the inner side wall of the battery cover 902 in an axis that is parallel to the underside of the battery cover 902.

The retention protrusion 915, the retention protrusion 917, the retention protrusion 923, and the retention protrusion 925 may allow the battery cover 902 to be in contact with the main body 350. For example, the retention protrusion 917 may engage with the recess 913, the retention protrusion 915 may engage with the recess 911, the retention protrusion 925 may engage with the recess 919, and/or the retention protrusion 923 may engage with the recess 921.

The battery cover 902 may comprise the battery case tab 904, the battery case tab 990, the battery case tab 991, the battery case tab 998, the retention protrusion 915, the retention protrusion 917, the retention protrusion 923, and the retention protrusion 925, and the screw guide 929. The battery cover 902 may cover a lower portion of the main body 350. The battery cover 902 may cover the battery cavity 910 in the main body 350 that may contain the battery 906 and/or the battery 908. The battery 906 and/or the battery 908 may lie a battery such as a lithium ion battery, an alkaline battery, and/or the like. The battery cover 902 may have a top side that may not include any tabs, an underside that includes a number of tabs. The underside of the battery cover 902 may face the battery cavity 910. Although the embodiments disclosed herein may be shown using a coin battery, other battery shapes and/or sizes may be used. For example, the main body 350 may be reconfigured to be used with an A battery, a AA battery, a AAA battery, and/or the like.

The battery case tab 990 may protrude from the underside of the battery cover 902 and may end in a foot that may protrude towards the battery case tab 988. The battery case tab 991 may protrude from the underside of the battery cover 902 and may end in a foot that may protrude towards the battery case tab 988. The battery case tab 988 may protrude from the underside of the battery cover 902 and may end in a foot that may protrude toward the battery case tab 990. The battery case tab 990, the battery case tab 991, and the battery case tab 988 may be a set distance apart such that the battery connector 920 may be snap fit into battery case tab 990, the battery case tab 991, and the battery case tab 988.

The battery connector 920 may be made of an electric conductive material such as a metal. The battery connector 920 may have the rectangular aperture 918 in its center. The battery case tab 991 may go through the rectangular aperture 918 to allow the battery connector 920 to snap fit into battery case tab 991. The battery connector 920 may have the battery contact protrusion 916 at one end and the battery contact protrusion 922 at another end. The battery contact protrusion 916 and/or the battery contact protrusion 922 may be a conical frustum. The conical frustum may protrude on the side of the battery connector 920 that may face the batteries.

The battery connector 920 may have the notch 978 at one end and the notch 980 at the other end. The battery connector 920 may be snap fit into the battery cover 902. For example, the battery case tab 990 may engage the notch 978 and the battery case tab 988 may engage the notch 980 such that the battery connector may be snap fir into the battery cover case 902.

The battery cover 902 may comprise the battery case tab 904 and the screw guide 929. The battery case tab 904 may protrude in a parallel direction from the underside of the battery cover 902 towards an end of the battery case cover 902. The battery case tab 904 may connect the battery cover 902 to the main body 350 by engaging with the notch 989. The screw guide 929 may be connected the battery cover 902. The screw guide 929 may include a clip that may retain a screw. For example, the screw guide 929 may retain a screw when the screw is not engaged with the screw boss 927.

The screw guide 929 may protrude orthogonally from the battery cover 902. The distal end of the screw guide 929 may be rounded or may be a half circle. The proximal end of the screw guide 929 may be a rectangular shape and may have a surface in contact with the battery cover 902. The screw guide 929 may have an aperture. The aperture of the screw guide 929 may be along an axis that may be parallel to the underside surface of the battery cover 902. The aperture of the screw guide 929 may allow a screw to go through the screw guide 929 and contact the screw boss 927. The battery cover 902 may be connected to the main body 350 and may be screwed into place via a screw that goes through an aperture of the screw guide 929 and connects with the screw boss 927.

The main body 350 may comprise of an upper portion and a lower portion. The upper portion of the main body 350 may comprise the outer rip housing 110. The outer tip housing 110 may be a conical shape and may comprise an opening at the distal end such as the outer tip hole 948. The sidewall of the outer tip housing 110 may comprise a radial slot out such as the radial slot 900. The radial slot 900 may be a radial aperture such that radial protrusion 940 may go through the radial slot 900. The radial slot 900 and/or the radial protrusion 940 may allow for a speculum to be removably connected to the outer tip housing 110.

The outer tip housing 110 may be conically hollow inside. For example, the outer tip housing 110 may be conically hollow such that the inner tip housing 944 may fit inside the outer tip housing 110. The outer tip housing 110 may have a complementary shape to the inner tip housing 944.

The main body 350 may comprise a lower portion. The lower portion of the main body 350 may comprise the battery cavity 910. The battery cavity 910 may comprise the rectangular aperture 912 and the rectangular aperture 914. The rectangular aperture 912 may allow a portion of the biased member 926 to pass through such that the biased member 926 may contact the battery 906 when the battery 906 is within the battery cavity 910. The rectangular aperture 914 may allow a portion of the biased member 924 to pass through such that the biased member 924 may contact the battery 908 when the battery 908 is within the battery cavity 910.

The main body 350 may comprise an outer sidewall, such as the main body outer sidewall 982. The main body outer sidewall 982 may compose a notch, such as the switch notch 984. The switch notch 984 may be placed at the portion of the sidewall that contacts the otoscope back-plate 316. The switch notch 984 may be a rectangular shape and may complements the light switch 126.

The main body 350 may comprise the recess 911, the recess 913, the recess 923, and the recess 921. The recess 911, the recess 913, the recess 923, and/or the recess 921 may be a recess in a surface of the mam body 350 that may contact the battery cover 902. The recess 911, the recess 913, the recess 923, and/or the recess 921 may engage with a retention protrusion such that the battery cover 902 may be connected and/or in contact with the main body 350. For example, the recess 911 may engage with the retention protrusion 915, the recess 913 may engage with the retention protrusion 917, the recess 919 may engage with the retention protrusion 925, and/or the recess 921 may engage with the retention protrusion 923.

The main body 350 may comprise the screw boss 927. The screw boss 927 may be located at a lower end of the main body 350, away from the notch 989. The screw boss 927 may receive a screw that may be placed through the screw guide 929. The battery cover 902 may be connected to the main body 350 using a screw that may be placed through the screw guide 929 such dial the screw connects with the screw boss 927.

The main body 350 may comprise the battery case cut out 996. The battery case cut out 996 may be a cut our in a side wall of the main body 350. For example, the battery case cut out 996 may be a cut out in the main body outer sidewall 982. The battery case cut our 996 may be located at an end of the main body 350 that may be away from the notch 989. The battery case cut out 996 may be a shape that may be complementary to the screw guide 929. The screw guide 929 may fit within the battery case cur our 996.

The inner otoscope housing 942 may fit inside the main body 350. The inner otoscope housing 942 may comprise the inner tip housing 944, the otoscope tube 964, and the backer board 950 The inner otoscope housing 942 may be connected to the otoscope back plate 316 using a number of screws. For example, screw 930 may engage screw boss 954, screw 931 may engage screw boss 952, screw 932 may engage screw boss 956, screw 934 may engage screw boss 958, screw 927 may engage screw boss 960, and screw may engage screw boss 962.

The inner otoscope housing 942 may comprise a hollow portion that may contain a number of electronics. For example, the inner otoscope housing 942 may include a printed circuit board (PCB); a light source, such as an LED; a speaker; a lens; a combination thereof; and/or the like. The otoscope tube 964 may contact and/or be attached to the inner otoscope housing 942. The proximal end of the otoscope tube 964 may contact the inner otoscope housing 942.

The otoscope tube 965 may protrude from the inner otoscope housing 942 towards the otoscope back plate 316. The otoscope tube 964 may comprise a cylindrical protrusion with an outer wall, a hole at a distal end, and an inner wall formed by the hole. The outer wall of the otoscope tube 964 may have a smaller diameter than the aperture 968 in the otoscope back-plate 316. The otoscope tube 964 may pass through or protrude into the aperture 968 such that go to otoscope tube 964 may deliver an image from the inner tip hole 946 to the viewing portion 108 via the aperture 968.

The inner otoscope housing 942 may comprise the inner rip housing 944. The inner up housing 944 may be connected to the light pipe 938 and the light pipe 936. The light pipe 938 and/or the light pipe 936 may provide light, for example, by transporting light from an LED within the inner otoscope housing 942 towards the inner tip hole 946. The light pipe 938 and/or the light pipe 936 may be made the plastic, fiber optic, and/or another light carrying material.

The inner otoscope housing 942 may comprise the radial protrusion 940. The radial protrusion 940 may allow a removable speculum to be removably connected to the outer tip housing 110. The radial protrusion 940 may protrude orthogonally from an outer surface of the inner tip housing 944. The radial protrusion 940 may follow a radius along the outer surface of the inner rip housing 944.

The backer board 950 may connect to a bottom portion of the inner otoscope housing 942. The backer board 950 may comprise the biased member 924 and the biased member 926. The biased member 924 and/or the biased member 926 may be made of a resilient material and may be made of an electrically conducting material. For example, the biased member 924 and/or the biased member 926 may be made of copper. The bias members, such the biased member 926 and the biased member 926, may comprise three members. The first member that may be parallel to the backer board 950. The first member of the biased member 924 may be attached to a second member that protrudes along an axis away from the backer board 950 and towards the main body 350. The second member may be attached to a third member that may be parallel to the backer board 950.

A portion of the biased member 926 may pass through the rectangular aperture 912 such that tire biased member 926 may contact the battery 906 when the battery 906 is within the battery cavity 910. A portion of tire biased member 924 may to pass through rite rectangular aperture 914 such that the biased member 924 may contact the barren 908 when the battery 908 is within the battery cavity 910.

The otoscope back-plate 316 may be connected to the main body 350. The otoscope back-plate 316 may comprise the backing tab 970 and the backing tab 972. The backing tab 970 and backing tab 972 may protrude orthogonally from back-plate shoulder 976. The backing tab 970 may end in a foot that may extend inward towards backing tab 972. The backing tab 972 may end in a foot that may extend inwardly toward backing tab 972. The backing tab 970 and the backing tab 972 may be resilient and may be made of a resilient material.

The otoscope back-plate 316 may be removably connected to the main body 350. For example, the backing tab 970 may be resiliently connected to the main body tab 994 and the backing tab 972 may be resiliently connected to the main body tab 992 such that the otoscope back-plate 316 may be removably connected to the main body 350.

The otoscope back-plate 316 may comprise to back-plate shoulder 976. The back-plate shoulder 976 may be parallel to the otoscope engagement member 352 The back-plate shoulder 976 may connect with the back-plate lip 974. The back-plate lip 974 may protrude orthogonally from the back-plate shoulder 976. The back-plate lip 974 may fit within the main body 350 when the otoscope back-plate 316 is connected to the main body 350. The back-plate shoulder 976 may contact the main body 350 when the otoscope back-plate 316 is connected to the mam body 350.

The otoscope engagement member 352 may be connected to the otoscope engagement member 352. The otoscope engagement member 352 may allow the otoscope assembly 120 attach to, connect to, or engage with a clip engagement member of an otoscope clip.

The otoscope engagement member 352 may comprise a guide track, such as the guide track 314 and the guide track 315. The guide track may be a channel formed in a surface of the otoscope engagement member 352 that may face an inner surface of a clip engagement member. The guide track may be a channel in a surface of the otoscope engagement member 352 that may be orthogonal to a surface of the otoscope back-plate 316. The guide track may be connected to the otoscope back-plate 316 and may be connected a protruding connecting member, such as the protruding connecting member 310 and/or the protruding connecting member 311.

The otoscope engagement member 352 may have an undercut in one or more sides that may be orthogonal to the otoscope back-plate 316 such that an may be created overhang. The overhang may be parallel to the otoscope backplate 316. The undercut may be the guide track 314 and/or the guide t rack 315. The overhang may be the protruding connecting member 310 and/or the protruding connecting member 311. The overhang may include one or more receiver element that may be designed to engage with one or more resilient members, such as latching elements, within the channel 306 and/or the channel 307. The one or more receiver elements may be recesses, cut outs, detent indentation, and/or the like. For example, the protruding connecting member 310 may include receiver elements, such as the receiver element 309, the receiver element 312, and the receiver element 318. The receiver elements may engage with the latching element 300 and/or the latching element 302. As another example, the protruding connecting member 311 may include receiver elements, such as the receiver element 305, the receiver element 313, and the receiver element 317. The receiver elements may engage with the latching element 301 and/or the latching element 303.

A device for attaching a movable optical element to a smart device may be provided. The device may comprise a main body that may comprise an aperture and a first engagement member configured to engage with a second engagement member that belongs to a moveable optical element. The device may comprise a first surface that may be connected to the main body and may be configured to contact a first smart device surface. The device may comprise a piston that may comprise a second surface that may be parallel to the first surface and may be configured to contact a second smart device surface. The device may comprise threaded knob that may be connected to the piston through the aperture. The threaded knob may be configured to move the piston in a direction relative to the first surface when turned.

In an example, the movable optical element may be an otoscope.

In an example, the first surface may be a first non-scratch surface, and the second surface may be a second non scratch surface.

In an example, the aperture may be a first aperture and the main body may further comprise a second aperture that may be configured to be aligned with a viewing portion of the movable optical element.

In an example, the piston further may comprise a shaft with a threaded hole and a keyway.

In an example, the aperture may be a hub that may comprise a key that may be complementary to the keyway.

In an example, the piston further may comprise a third surface with an outer edge for aligning a viewing portion of the moveable optical element with a camera lens of the smart device.

A device for attaching a moveable optical element to a smart device may be provided. The device may comprise a main body that may comprise an aperture and a first engagement member that may be configured to engage with a second engagement member in a first position or a second position. The second engagement member may belong to a movable optical element. The device may comprise a first surface that may be connected to the main body and may be configured to contact a first smart device surface. The device may comprise a piston that may comprise, a shaft, a second surface and a third surface, wherein the second surface may be parallel to the first surface and may be configured to contact a second smart device surface, and wherein the third surface may comprise a protrusion for aligning a viewing portion of the moveable optical element with a camera lens of the smart device in a first axis. The device may comprise a knob connected to the shaft through the aperture.

In an example, the moveable optical element may be an otoscope.

In an example, the device may further comprise a threaded knob that may be connected to the piston through the aperture, wherein the threaded knob may be configured to move the piston in a direction relative to the first surface when turned.

In an example, the device may further comprise an alignment aperture for aligning the viewing portion of the moveable optical element with the camera lens in a second axis.

In an example, third surface may further comprise an outer edge that complements an alignment image to be displayed on the smart device.

In an example, the third surface may comprise a color that matches an alignment image to be displayed on the smart device.

In an example, the main body may comprise a top portion and a bottom portion, and wherein the first position may be within the top portion and the second position may be within the bottom portion.

A device for attaching an otoscope to a smart device may be provide. The device may comprise a main body that may comprise an aperture and an engagement member that may be configured to engage with a moveable otoscope in a first position or a second position. The device may comprise a first surface that may be connected to the main body and may be configured to contact a first smart device surface. The device may comprise a piston that may comprise a shaft and a second surface that may be parallel to the first surface and may be configured to contact a second smart device surface. The device may comprise a threaded knob that may lie connected to the shaft through the aperture, wherein the threaded knob may be configured to move the piston in a direction relative to the first surface when turned.

In an example, the otoscope may comprise a removable speculum. In an example, the otoscope may comprise a light emitting diode (LED).

In an example, the shaft may further comprise a threaded hole and a keyway.

In an example, the aperture may be a hub that may comprise a key that may be complementary to the keyway.

In an example, the aperture may be a first aperture and the main body may further comprise a second aperture that may be configured to be aligned with a viewing portion of movable otoscope in the first position or the second position.

A method for attaching an otoscope clip device to a smart device may be provided. A smart device may be placed in between a first surface of the otoscope clip device and a second surface of the otoscope clip device. An alignment tab of the otoscope clip device may be aligned with an alignment image on a display of the smart device. A threaded knob of the otoscope clip device may be rotated to cause the first surface of the otoscope clip device to contact the display and the second surface of the otoscope clip device to contact a back surface of the smart device.

In an example, the back surface of the smart device may comprise a camera of the smart device.

In an example, a video or image of the view may be viewed through an otoscope of the otoscope clip device on the display.

In an example, an alignment of the otoscope may be adjusted with a camera of the smart device.

In an example, rotating the threaded knob of the otoscope clip device may cause the first surface of the otoscope clip device to contact the display and may cause the second surface of the otoscope clip device to contact the back surface of the smart device, which may be done to ensure dial the otoscope clip device may be attached to the smart device.

In an example, the otoscope clip device may comprise an otoscope.

In an example, aligning the alignment tab of the otoscope clip device with the alignment image of the display of the smart device may align the otoscope with a camera of the smart device.

In an example, aligning the alignment tab of the otoscope clip device with the alignment image on the display of the smart device may further comprises aligning a first alignment tab feature of the alignment tab with a first object within the alignment image on the display of the smart device to vertically align the otoscope with a camera.

In an example, aligning the alignment tab of the otoscope clip device with the alignment image on the display of the smart device may further comprises aligning a second alignment tab feature of the alignment tab with a second object within the alignment image on the display of the smart device to horizontally align the otoscope with a camera.

In an example, at least one of the first alignment tab feature and the second alignment tab feature may comprise at least a protrusion, a hole, an aperture, a color, a design, an icon, an etching, a symbol, a window, or a clear portion of the alignment tab.

In an example, aligning the alignment tab of the otoscope clip device with the alignment image on the display of the smart device may further comprise aligning an outer edge of the alignment tab with an outline of the alignment image.

In an example, a video or image of a view may be recorded through an otoscope of the otoscope clip device.

In an example, an otoscope of the otoscope clip device may be moved into a first position or a second position within the otoscope clip device to align the otoscope with a camera of the smart device.

In an example, an otoscope of the otoscope clip device may be moved into a lower position within the otoscope clip device to assist with aligning the otoscope with a camera of the smart device.

In an example, an otoscope of the otoscope clip device may be moved into an upper position within the otoscope clip device to assist with aligning the otoscope with a camera of the smart device.

This application may refer to "determining" various pieces of information. Determining the information can include one or more of, for example, estimating the information, calculating the information, predicting the information, or retrieving the information from memory.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that tire use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

We describe a number of examples. Features of these examples can be provided alone or in any combination, across various claim categories and types. Further, embodiments can include one or more of the following features, devices, or aspects, alone or in any combination, across various claim categories and types.

The invention claimed is:

1. A device for attaching a movable optical element to a smart device, the device comprising:
- a main body comprising an aperture and a first engagement member, wherein the first engagement member is configured to engage with a second engagement member in a first position or a second position, and wherein the second engagement member belongs to a moveable optical element;
- a first surface connected to the main body and configured to contact a first smart device surface;
- a shaft, wherein the shaft comprises a first end and a second end, wherein the first end comprises a threaded hole, wherein the second end comprises a second surface, and wherein the second surface is parallel to the first surface and is configured to contact a second smart device surface;
- a third surface that is connected to the second surface, wherein the third surface comprises a protrusion for aligning a viewing portion of the movable optical element with a camera lens of the smart device in a first axis, wherein the camera lens is located on the first smart device surface; and
- a threaded knob comprising a threaded protrusion, wherein the threaded protrusion protrudes through the aperture of the main body and is connected to the threaded hole of the shaft, and wherein the threaded knob is configured to move the shaft in a direction relative to the first surface when turned.

2. The device of claim 1, wherein the movable optical element is an otoscope.

3. The device of claim 1, wherein the first surface is a first non-scratch surface, and the second surface is a second non-scratch surface.

4. The device of claim 1, wherein the aperture is a first aperture and the main body further comprises a second aperture configured to be aligned with a viewing portion of the movable optical element.

5. The device of claim 1, wherein the shaft comprises a keyway.

6. The device of claim 5, wherein the aperture is a hub that comprises a key that is complementary to the keyway.

7. The device of claim 1, wherein the third surface comprises an outer edge for aligning a viewing portion of the movable optical element with a camera lens of the smart device.

8. A device for attaching a movable optical element to a smart device, the device comprising:
- a main body comprising an aperture and a first engagement member, wherein the first engagement member is configured to engage with a second engagement member in a first position or a second position, and wherein the second engagement member belongs to a movable optical element;
- a first surface connected to the main body and configured to contact a first smart device surface;
- a shaft, wherein the shaft comprises a first end and a second end, wherein the first end comprises a threaded hole, and wherein the second end comprises a second surface, and wherein the second surface is parallel to the first surface and is configured to contact a second smart device surface;
- a third surface that is connected to the second surface, wherein the third surface comprises a protrusion for aligning a viewing portion of the movable optical element with a camera lens of the smart device in a first axis, and wherein the camera lens is located on the first smart device surface; and
- a knob comprising a threaded protrusion, wherein the threaded protrusion protrudes through the aperture of the main body and is connected to the threaded hole of the shaft.

9. The device of claim 8, wherein the movable optical element is an otoscope.

10. The device of claim 8, wherein the knob is configured to move the shaft in a direction relative to the first surface when turned.

11. The device of claim 8, wherein the third surface further comprises an alignment aperture for aligning the viewing portion of the movable optical element with the camera lens in a second axis.

12. The device of claim 8, wherein the third surface further comprises an outer edge that complements an alignment image to be displayed on the smart device.

13. The device of claim 8, wherein the third surface comprises a color that matches an alignment image to be displayed on the smart device.

14. The device of claim 8, wherein the main body comprises a top portion and a bottom portion, and wherein the first position is within the top portion and the second position is within the bottom portion.

15. A device for attaching an otoscope to a smart device, the device comprising:
- a main body comprising an aperture and a first engagement member, wherein the first engagement member is configured to engage with a second engagement member in a first position or a second position, and wherein the second engagement member belongs to a movable otoscope;
- a first surface connected to the main body and configured to contact a first smart device surface;
- a shaft, wherein the shaft comprises a first end and a second end, wherein the first end comprises a threaded hole, and wherein the second end comprises a second surface, and wherein the second surface is parallel to the first surface and is configured to contact a second smart device surface;
- a third surface that is connected to the second surface, wherein the third surface comprises a protrusion for aligning a viewing portion of the movable otoscope with a camera lens of the smart device in a first axis, and wherein the camera lens is located on the first smart device surface; and
- a threaded knob comprising a threaded protrusion, wherein the threaded protrusion protrudes through the aperture of the main body and is connected to the threaded hole of the shaft, and wherein the threaded knob is configured to move the shaft in a direction relative to the first surface when turned.

16. The device of claim 15, wherein the otoscope comprises a removable speculum.

17. The device of claim 15, wherein the otoscope comprises a light emitting diode (LED).

18. The device of claim 15, wherein the shaft further comprises a keyway.

19. The device of claim 18, wherein the aperture is a hub that comprises a key that is complementary to the keyway.

20. The device of claim 18, wherein the aperture is a first aperture and the main body further comprises a second aperture configured to be aligned with a viewing portion of the movable otoscope in the first position or the second position.

* * * * *